US008335266B2

(12) United States Patent
Liu et al.

(10) Patent No.: US 8,335,266 B2
(45) Date of Patent: Dec. 18, 2012

(54) EXPEDITED SPLICING OF VIDEO STREAMS

(75) Inventors: Xiaomei Liu, San Jose, CA (US); Yi Tong Tse, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1408 days.

(21) Appl. No.: 11/824,452

(22) Filed: Jun. 29, 2007

(65) Prior Publication Data

US 2009/0003432 A1 Jan. 1, 2009

(51) Int. Cl.
*H04B 1/66* (2006.01)
(52) U.S. Cl. ......... 375/240.26; 375/240.28; 375/240.25; 375/240.24; 375/240.01; 382/235; 382/233; 382/239; 382/232
(58) Field of Classification Search ............. 375/240.26, 375/240.28, 240.25, 240.24, 240.01; 382/235, 382/233, 239, 232
See application file for complete search history.

(56) References Cited

U.S. PATENT DOCUMENTS

| | | | |
|---|---|---|---|
| 5,907,374 | A | 5/1999 | Liu |
| 5,912,709 | A | 6/1999 | Takahashi |
| 5,982,436 | A | 11/1999 | Balakrishnan et al. |
| 6,038,000 | A | 3/2000 | Hurst, Jr. |
| 6,101,195 | A | 8/2000 | Lyons et al. |
| 6,104,441 | A * | 8/2000 | Wee et al. ............... 375/240.15 |
| 6,487,721 | B1 | 11/2002 | Safadi |
| 6,611,624 | B1 | 8/2003 | Zhang et al. |
| 7,096,488 | B1 * | 8/2006 | Zhang et al. ............ 725/105 |

OTHER PUBLICATIONS

U.S. Appl. No. 11/688,609, filed Mar. 20, 2007.
C.H. Birch, "MPEG Splicing and Bandwidth Management," International Broadcasting Convention, Sep. 12-16, 1997, pp. 541-546.
Zhang et al., "Methods and Apparatus for Facilitating Network Splicing," U.S. Appl. No. 11/482,573, filed Jul. 7, 2006.
International Organisation for Standardisation Organisation Internationale De Normalisation, "Generic Coding of Moving Pictures and Associated Audio: Systems," ISO/IEC JTC1/SC29/WG11/N0801, Nov. 13, 1994.
Society of Cable Telecommunications Engineers, Inc. Engineering Committee Digital Video Subcommittee, "Digital Program Insertion Splicing API," Document DVS, Nov. 15, 2000, 28 pages.
Carlos V. Girod, Jr. "Standards and Recommended Practices", SMPTE Journal, Oct. 1998, pp. 915-925.
M. Knee and N. Wells, "Seamless Concatenation—A 21st Century Dream", Paper Presented at the International Television Symposium (ITVS) Montreux, Jun. 16, 1997, 11 pages.

(Continued)

*Primary Examiner* — Shawn An
(74) *Attorney, Agent, or Firm* — Weaver Austin Villeneuve & Sampson LLP

(57) ABSTRACT

In one embodiment, a method is described that includes receiving a conditioned bitstream that includes a digital insertion location and primary network packets that contain compressed video data. The digital insertion location includes replaceable network packets. The method also includes receiving a second bitstream that includes replacement compressed video data. The method also includes determining a location of the digital insertion location. The method further includes adjusting the bitrate of the replacement compressed video data to create adjusted replacement compressed video data. The method further includes providing timestamp information with the replacement compressed video data. The method additionally includes packetizing the adjusted replacement compressed video data and timestamp information into replacement network packets. The method further includes combining the replacement network packets into the digital insertion location in the conditioned bitstream at the network packet level without depacketizing or decompressing the compressed video data in the primary network packets.

29 Claims, 10 Drawing Sheets

OTHER PUBLICATIONS

Motion Picture and Television Engineers, "SMPTE Standard for Television—Splice Points for MPEG-2, Transport Streams", SMPTE 312M-1999, 20 pages.

Le Gall, Didier J. "MPEG: A Video Compression Standard for Multimedia Applications", Communications of the ACM, Apr. 1991, vol. 34, No. 4, pp. 47-57.

Le Gall, Didier J. "MPEG Video Compression Algorithm. A Review". Proc. SPIE vol. 1452, Image Processing Algorithms and Techniques II (1991), pp. 444-457.

Joe Davis, Digital Video Systems Document Invention Disclosure, San Jose, California Jul. 16, 1997.

\* cited by examiner

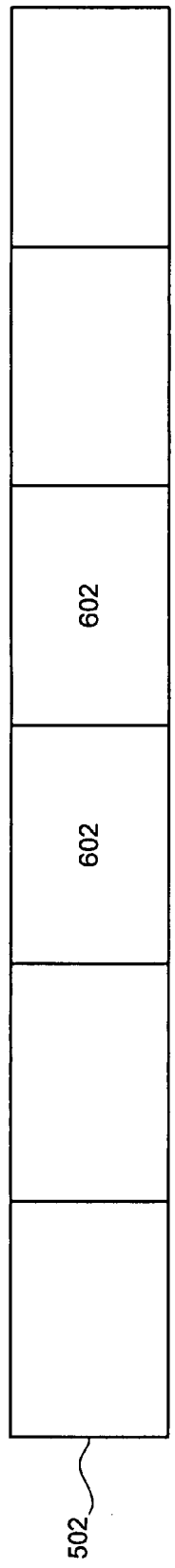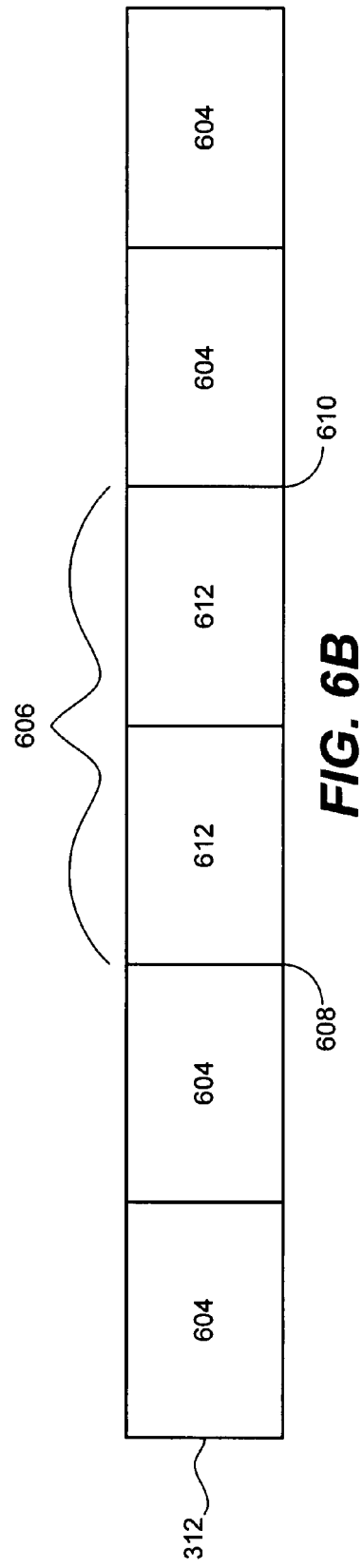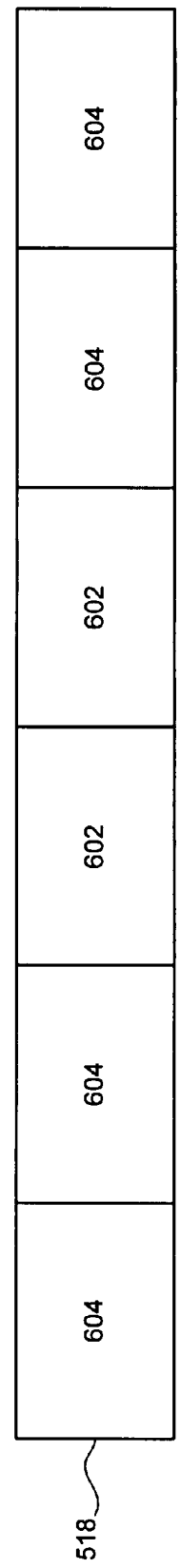

EXPEDITED SPLICING OF VIDEO STREAMS

TECHNICAL FIELD

The present disclosure relates generally to media delivery, and more particularly to transmitting compressed digital video data in a manner that allows a downstream network device to readily combine multiple compressed video data using network packet level manipulation without decompressing the compressed video data.

BACKGROUND

In many multimedia delivery applications, compressed video programs are delivered simultaneously to numerous digital receivers/decoders. According to the traditional broadcast model, the same video content is broadcast to all of the receivers in a service area. As such, the same generic advertisements are broadcast to all receivers in the service area. However, network providers, and their associated advertising clients, generally benefit from targeting a commercial advertisement to a specific audience. Hence, it may be desirable to alter the original broadcast bitstream on each of the channel paths. By way of example, local advertisers may intercept a video program (e.g., a CNN feed or a nationally broadcast sporting event) and insert local ads targeted at a local audience. In this way, multicast advertisements may be altered or tailored for a subset of receivers in a service area. Continuing, such tailored advertising may be even more desirable in unicast applications in which video program content is tailored to a single destination/viewer.

Digital stream insertion (also called digital program insertion, digital spot insertion, etc.) is a process that replaces part of a digital bitstream with another bitstream. The underlying technique for digital stream insertion is bitstream splicing (also known as bitstream concatenation), where a transition is made from a first bitstream to a second bitstream. The transition point is referred to as a splice point. In many conventional broadcast systems, digital stream insertion is performed at the MPEG transport stream level. To complicate matters, both the video program and the local content bitstreams are typically encoded in a different location and/or at a different time. Thus, conventionally, the splicing of two bitstreams comprising compressed data often requires decoding and re-encoding of both compressed bitstreams in order to allow seamless output of the video data from a downstream decoder. Additionally, it should be appreciated that the two bitstreams must be re-encoded throughout the entire stream playtime, not just around the splice points. Decoding and re-encoding the compressed video data is a computationally intensive operation, and often overwhelming for a downstream network device charged with processing numerous bitstreams simultaneously.

BRIEF DESCRIPTION OF THE DRAWINGS

The present invention is illustrated by way of example, and not by way of limitation, in the figures of the accompanying drawings and in which like reference numerals refer to similar elements.

FIGS. 6A-6C illustrate an example of a local content bitstream, an example of a conditioned bitstream and an example of an output bitstream, respectively, in accordance with one embodiment.

DESCRIPTION

Overview

Figure 1:
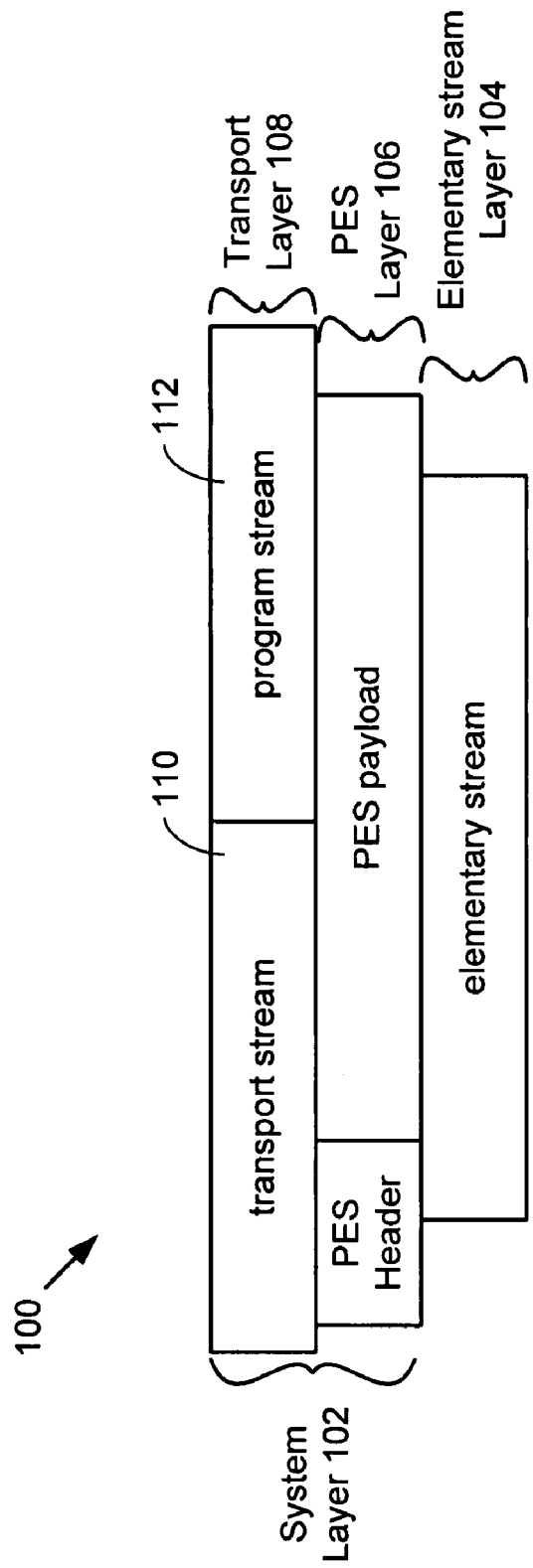
FIG. 1 illustrates an example transmission bit stream having an MPEG-2 format in accordance with one embodiment.

In one embodiment, a method for providing an output bitstream onto a channel is described. The method includes receiving a conditioned bitstream that includes a digital insertion location and primary network layer packets that contain compressed video data. The digital insertion location includes a number of replaceable network layer packets. The compressed video data in the primary network layer packets of the conditioned bitstream is temporally independent of the digital insertion location. The method also includes receiving a second bitstream that includes replacement compressed video data to be inserted into the digital insertion location in the conditioned bitstream. The method also includes determining a location of the digital insertion location in the conditioned bitstream. The method further includes adjusting the bitrate of the replacement compressed video data in the second bitstream to be inserted into the digital insertion location to create adjusted replacement compressed video data. The bitrate of the replacement compressed video data is adjusted such that a virtual buffer of a modeled decoder that receives an output bitstream from a channel does not experience overflow or underflow. The method further includes providing timestamp information with the replacement compressed video data. The timestamp information is configured to inform a decoder that receives the output bitstream when and where to position replacement video data, derived from the replacement compressed video data after decoding, relative to video data included in the compressed video data in the primary network layer packets. The method additionally includes packetizing the adjusted replacement compressed video data and timestamp information into replacement network layer packets. The method further includes combining the replacement network layer packets into the digital insertion location in the conditioned bitstream at the network packet level. The combining is performed such that the replacement network layer packets replace the replaceable network layer packets in the conditioned bitstream, without depacketizing the compressed video data in the primary network packets and without decompressing the compressed video data in the primary network packets. The combing results in the output bitstream including the primary network layer packets of the conditioned bitstream and the replacement compressed video data and timestamp information of the second bitstream. The method also includes transmitting the output bitstream onto the channel.

In another embodiment, a network device for providing an output bitstream onto a channel is described. The network device includes a first network receiver interface configured to receive a conditioned bitstream that includes a digital insertion location and primary network layer packets that contain compressed video data. The digital insertion location includes a number of replaceable network layer packets. The compressed video data in the primary network layer packets of the conditioned bitstream is temporally independent of the digital insertion location. The first network receiver interface is also configured to receive a second bitstream that includes replacement compressed video data to be inserted into the digital insertion location in the conditioned bitstream. The network device also includes an extractor configured to determine a location of the digital insertion location in the conditioned bitstream. The network device also includes a transcoder configured to adjust the bitrate of the replacement compressed video data in the second bitstream to be inserted into the digital insertion location to create adjusted replacement compressed video data. The bitrate of the replacement compressed video data is adjusted such that a virtual buffer of a modeled decoder that receives an output bitstream from a channel does not experience overflow or underflow. The network device further includes an embedder configured to provide timestamp information with the replacement compressed video data. The timestamp information is configured to inform a decoder that receives the output bitstream when and where to position replacement video data, derived from the replacement compressed video data after decoding, relative to video data included in the compressed video data in the primary network layer packets. The network device also includes a packetizer configured to packetize the adjusted replacement compressed video data and timestamp information into replacement network layer packets. The network device further includes a combiner configured to combine the replacement network layer packets into the digital insertion location in the conditioned bitstream at the network packet level. The replacement network layer packets are combined such that the replacement network layer packets replace the replaceable network layer packets in the conditioned bitstream, without depacketizing the video data in the primary network packets and without decompressing the video data in the primary network packets, to produce the output bitstream including the primary network layer packets of the conditioned bitstream and the replacement compressed video data and timestamp information of the second bitstream. The network device also includes a second network interface configured to transmit the output bitstream onto the channel.

In another embodiment, software encoded in one or more computer readable media is described that when executed is operable to receive a conditioned bitstream that includes a digital insertion location and primary network layer packets that contain compressed video data. The digital insertion location includes a number of replaceable network layer packets. The compressed video data in the primary network layer packets of the conditioned bitstream is temporally independent of the digital insertion location. The software is also operable to receive a second bitstream that includes replacement compressed video data to be inserted into the digital insertion location in the conditioned bitstream. The software is also operable to determine a location of the digital insertion location in the conditioned bitstream. The software is further operable to adjust the bitrate of the replacement compressed video data in the second bitstream to be inserted into the digital insertion location to create adjusted replacement compressed video data. The bitrate of the replacement compressed video data is adjusted such that a virtual buffer of a modeled decoder that receives an output bitstream from a channel does not experience overflow or underflow. The software is further operable to provide timestamp information with the replacement compressed video data. The timestamp information is configured to inform a decoder that receives the output bitstream when and where to position replacement video data, derived from the replacement compressed video data after decoding, relative to video data included in the compressed video data in the primary network layer packets. The software is also operable to packetize the adjusted replacement compressed video data and timestamp information into replacement network layer packets. The software is further operable to combine the replacement network layer packets into the digital insertion location in the conditioned bitstream at the network packet level such that the replacement network layer packets replace the replaceable network layer packets in the conditioned bitstream, without depacketizing the video data in the primary network packets and without decompressing the video data in the primary network packets, to produce the output bitstream including the primary network layer packets of the conditioned bitstream and the replacement compressed video data and timestamp information of the second bitstream. The software is also operable to transmit the output bitstream onto the channel.

DESCRIPTION OF EXAMPLE EMBODIMENTS

In the following description, numerous specific details are set forth in order to provide a thorough understanding of the disclosed embodiments. It will be obvious, however, to one skilled in the art, that the disclosed embodiments may be practiced without some or all of these specific details. In other instances, well known process steps have not been described in detail in order not to unnecessarily obscure the disclosed embodiments.

Systems and methods for providing compressed video data from multiple bitstreams are described. In particular, systems and methods are described that utilize a two-stage strategy to seamlessly combine multiple bitstreams. In the first stage, a conditioning step is performed on a bitstream comprising compressed video data, the output of which is a conditioned bitstream that is able to receive digital insertions without subsequent decompression, decryption or computationally intensive processing of the compressed video data. The conditioning includes re-encoding of an incoming bit stream such that compressed video data in the bitstream immediately before a splice-in point and immediately after a splice-out point corresponding to a digital insertion location does not have temporal reliance across the digital insertion location. This conditioning may be performed by an upstream network device that transmits the conditioned bitstream onto a network channel.

The conditioned compressed video data is packetized into network packets. Since temporal reliance of the compressed video data on opposite sides of the digital insertion location has been removed, the compressed video data from opposite sides of the digital insertion location may be placed in separate network packets. Correspondingly, the splicing of a second bitstream into the digital insertion locations, which may occur at different locations and at different times, may occur without removal of the video data from the network packets used to transmit the conditioned bitstream. By way of example, the second bitstream may include downstream content such as local video programs or local advertisements.

In the second stage, e.g., at a downstream network device, combining (i.e., splicing) of compressed video data from the second bitstream into the conditioned bitstream is performed.

The splicing takes advantage of the changes made to the conditioned bitstream. Since the conditioned bitstream is re-encoded upstream to allow the splicing at the digital insertion locations, splicing at this time may advantageously occur without re-encoding (or transcoding if not needed) of the compressed video data in the conditioned bitstream. In addition, the splicing may occur at the network packet level, that is, without removing the video data from the network packets.

According to particular embodiments, video data from the second bitstream is adjusted such that downstream buffer levels do not overflow or underflow. Additionally, the second video data may be adjusted such that the timebase in the resultant spliced bitstream is continuous. In one particular embodiment, timestamps are provided with the second video data inserted into the digital insertion location to permit a downstream decoder to properly order the decoded data from the spliced conditioned and second bitstreams.

Compression according to the MPEG standard will first be briefly described in order to facilitate the following description of particular embodiments. While the following description will focus primarily in terms of transmission based on manipulation of video data compressed according to MPEG standards, it should be appreciated that other video compression and packaging schemes may be used as well. Other compression standards suitable for use may include MPEG-1/2/4 compression, H.26X compression for video conferencing, compression using proprietary video stream formats, and compression of non-real-time data bit streams, or any other compression formats that use block-based compression.

FIG. 1 illustrates an example embodiment of a bitstream 100 having an MPEG-2 compression format. The MPEG-2 compression standard consists of two layers of information: a system layer 102 an elementary stream layer 104. The system layer 102 is defined to allow a decoder to correctly decode audio and video data, and present the decoded result to a video screen in a time continuous manner. The system layer 102 comprises two sub layers: a packetized elementary stream (PES) layer 106 and an MPEG transport layer 108 above the PES layer 106. PES layer 106 defines how the elementary stream layer is encapsulated into variable length packets referred to as PES packets. In addition, the PES layer 106 includes presentation timestamps (PTS) and decoding timestamps (DTS) for the PES packets. The PTSs and DTSs are included to ensure that a downstream decoder positions the decoded video frames in the proper order for subsequent display. MPEG transport layer 108 defines how the PES packets are further packetized into MPEG transport packets. For example, the PES packets may be packetized into fixed sized MPEG transport packets to produce a network stream according to a specific network protocol (described below). Additional timing information and multiplexing information may be added by the MPEG transport layer 108.

The MPEG transport layer 108 is further divided into a transport stream 110 and a program stream 112. The program stream 112 defines how the PES packets are encapsulated into variable sized packets and may also include additional timing and multiplexing information. The program stream 112 is designated for use in relatively error free environments and is suitable for applications that may involve software processing of system information such as interactive multimedia applications. The transport stream 110 is optimized for use in environments where errors are likely such as storage or transmission in a lossy or noisy media. Applications using the transport stream 110 include Direct Broadcast Service (DBS), digital or wireless cable services and broadband transmission systems, among others. The transport stream 110 offers features for error correction and for transportation over unreliable media. As such, the transport stream 110 is generally used in broadcast applications. According to particular embodiments, video data is packetized into MPEG transport stream packets with a constant bitrate (CBR).

The elementary stream layer 104 defines how compressed video (or audio) data signals are sampled, motion compensated, transform coded, quantized and represented by different variable length coding (VLC) tables. The elementary stream layer 104 contains the coded picture data and specifies whether a frame is an intra frame (I frame) containing full picture information, a predicted frame (P frame), which is constructed using a past I or P frame, or a bi-directional frame (B frame), which is bi-directionally constructed using past or future I, P or B frames. The basic structure for the coded picture data is a block that comprises an 8 pixel by 8 pixel array. Multiple blocks form a macroblock, which in turn forms part of a slice. A coded picture consists of multiple slices. Multiple coded pictures form a group of pictures. Such hierarchical layering of data structures allows processing according to particular embodiments to occur on a compressed layer, namely coded pictures. In a particular embodiment, conditioning of compressed MPEG-2 video data is a process that occurs on the coded pictures.

Temporal reliance in compressed video data is an artifact of compression. Generally speaking, temporal reliance in compressed video data refers to relationships and dependency between different portions of the compressed data created during compression of the raw video data. Compression typically reduces the bitrate required to transmit video data by removing temporal redundancy between video frames. For MPEG compression, motion estimation removes temporal redundancy between frames using motion vectors. The motion vectors from one frame may reference another frame in order to reduce the bitrate required to transmit the video data; thus creating temporal reliance between compressed video frames (e.g., between a P frame and a preceding I frame). In particular embodiments, temporal reliance between compressed video data is removed for portions of a bitstream. More specifically, compressed video data surrounding splicing locations is re-encoded such that the bitstream may be subsequently spliced without incurring video output degradation resulting from splicing between temporally dependent compressed video data. Although temporal reliance of the compressed video data surrounding a digital insertion location is removed, the uncompressed video data may still be related in a time continuous manner if no video splicing takes place, as one of skill in the art will appreciate.

In one particular embodiment, according to an MPEG PES format, timing information is embedded in a payload of local content PES packets with different reserved stream IDs. Presentation Time Stamps (PTS) and Decoding Time Stamps (DTS) in the PES header may be used to provide synchronization between the information in the PES packets after depacketization at a downstream decoder. When the information is contained in a PES packet, the information may be placed inside the PES packet header PES_packet_data_byte field. For MPEG processing, this allows a PES header parser to extract all of the bytes of PES_packet_data_byte without inspecting the content of the data section. In another embodiment for MPEG transport stream operation, the information is placed in separate transport packets each having a unique packet identification (PID). The information may be stored as the payload of the transport packets.

Timing in the MPEG transport stream may use a system time clock (STC) of the encoder used to encode the MPEG bitstream. During decoding, the decoder's internal clock should synchronize with the encoder's STC. In a specific embodiment, this is achieved via insertion, by the encoder, of time stamps into the MPEG transport stream for each video program. Each time stamp is generally referred to as a program clock reference (PCR). The decoders use the time stamps to synchronize to the encoded data stream in order to properly decode the video and/or audio program material. Excessive PCR jitter may adversely impact a decoder's ability to properly decode the data stream. More particularly, excessive PCR jitter may result in visual impairments such as pixelization, frame freezes and loss of color, among others. The amount of acceptable PCR jitter is determined by various parameters, including decoder buffer levels and the software used by the decoder. PCR jitter may be a result of many factors. By way of example, overall network packet jitter resulting from packet congestion may result in PCR jitter.

The structure of an MPEG bit stream is well known to one of skill in the art and is described by the MPEG standards. Particular embodiments are suitable for use with the MPEG-1 specification, described in ISO/IEC International Standard 11172; "Coding of moving pictures and associated audio for digital storage media up to about 1.5 Mbits/s", November 1993, which is herein incorporated by reference. Particular embodiments are also suitable for use with the MPEG-2 specification, described in ISO/IEC International Standard 13818; "Generic coding of moving pictures and associated audio information", November 1994, which is herein incorporated by reference. Particular embodiments are also suitable for use with the MPEG-4 specification, described in ISO/IEC International Standard; "Coding of moving pictures and associated audio information", March 2000, which is herein incorporated by reference.

Figure 2:
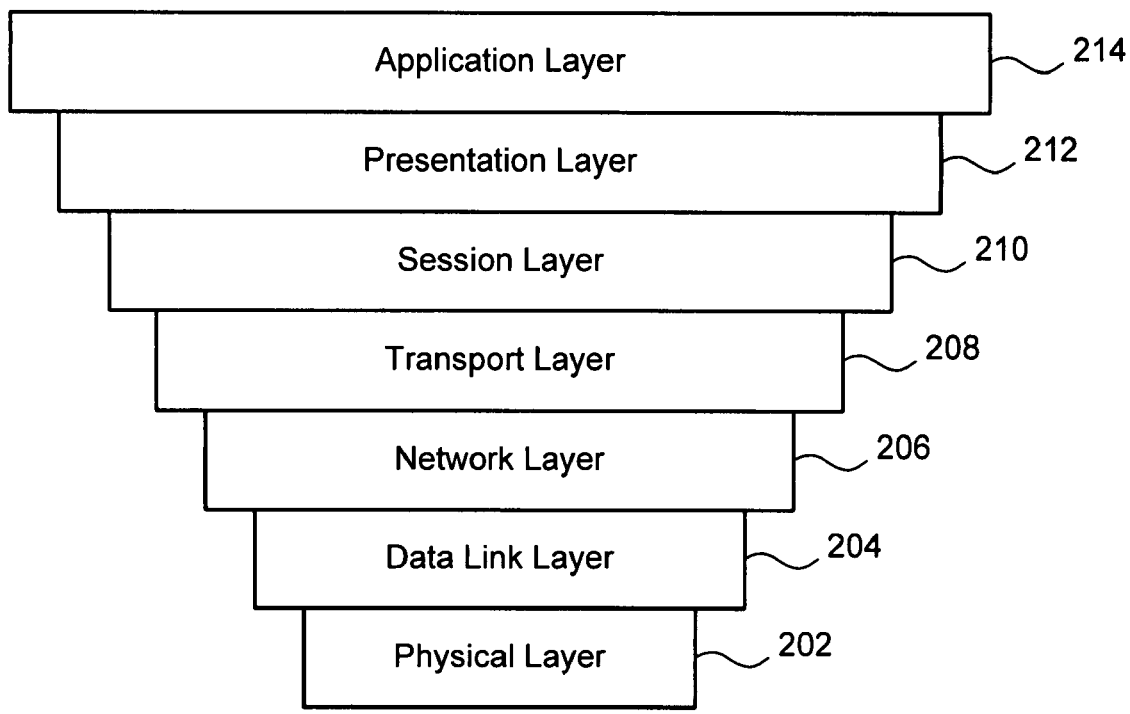
FIG. 2 illustrates the seven-layer Open Systems Interconnection Basic Reference Model.

Network protocol will now be briefly described to facilitate description of particular embodiments. FIG. 2 illustrates the seven-layer Open Systems Interconnection Basic Reference Model (OSI model) which describes the hierarchical structured layering of data for communications and network protocol design. The lowest level layer is referred to as the physical layer 202. The physical layer 202 provides the means of transmitting bits over a physical data link. The MPEG compressed video data is a part of the physical layer 202. It should be noted that no packet headers or trailers are added to the data by the physical layer 202. Layer two of the OSI model is referred to as the data link layer 204; the role of layer 204 is primarily to ensure node to node packet delivery.

The network layer 206 (sometimes also referred to as the internet layer) is the third layer in the OSI model. Essentially, the network layer 206 functions to ensure end to end packet delivery. More particularly, the network layer 206 provides the functional and procedural means of transferring variable length data sequences from a source to a destination over one or more networks. By way of example, the Internet Protocol (IP) is a network layer protocol. One of the primary roles of the IP is assigning IP addresses to ensure unique global communication.

Layer four of the OSI model is referred to as the network transport layer 208 (not to be confused with the MPEG transport layer described above). Essentially, the network transport layer 208 provides transparent transfer of data between hosts and is responsible for end-to-end connection, error recovery, flow control and ensuring complete data transfer. By way of example, the Transmission Control Protocol (TCP) and User Datagram Protocol (UDP) are transport layer protocols. UDP is referred to as an "unreliable" protocol and is generally used for applications such as streaming media where faster arrival times are more important than reliability. UDP is generally required for broadcast applications.

The fifth layer, the session layer 210, provides interhost communication. The sixth layer, the presentation layer 212, conveys the delivery and formatting of information to the application layer 214. Typically, encryption is performed at the presentation layer 212, although it should be appreciated that encryption can be performed at other layers as well.

Lastly, the application layer 214, the highest layer, performs application services for application processes. In other network protocol models, the session, presentation and applications layers are often grouped together and simply referred to as the application layer. The Real-time Transport Protocol (RTP) is a session layer protocol or application layer protocol, depending on how the layers are defined. See for example RFC-2250 "RTP Payload Format for MPEG1/MPEG2 Video", January 1998, and RFC-1889 "RTP: A Transport Protocol for Real-Time Applications", January 1996. Both of these documents are incorporated herein by reference for all purposes. RTP defines a standardized packet format for delivering audio and video over the internet and uses the UDP packet format as a basis. RTP provides services such as payload type identification, sequence numbering, time stamping and delivery monitoring. Of particular note, are the sequence numbering and time stamping services provided by RTP. More specifically, the sequence numbering allows for the identification of lower level packets while time stamping allows for synchronization, proper ordering of data and jitter calculations.

The definition of a splice point may vary depending on which layer one is referring to. At the elementary stream level, a splice point may be defined as the point that separates data between two neighboring access units, that is, all data after the splice point is included with the next frame and all data before the splice point is included with the previous frame. On a higher layer, a splice point refers to delineation at packet boundaries, and not, within the payload of the packets. Specifically, a PES layer splice point may refer to the packet boundary before the first PES packet whose elementary stream payload starts with the first byte after the elementary stream splice point. Extending this logic one more layer, an MPEG transport layer packet splice point may refer to the packet boundary before the first MPEG transport packet whose payload starts with the first byte of the PES layer splice point. A similar logic may be applied to an IP splice point, ATM splice point, or other network protocol frame splice point, etc.; that is, by way of example, an IP packet splice point may refer to the packet boundary before the first IP packet whose payload starts with the first byte of the MPEG transport layer packet splice point.

Although the splicing described herein is generally described in the context of multiplexing a network bitstream (such as a broadcast, multicast or unicast signal) and a local content bitstream (such as a local advertisement signal), it will be understood that splicing as described herein can be applied to numerous other scenarios. By way of example, splicing may be applied between two video files or between two live network signals, among other applications. In the present context, splicing is an operation that switches off (or out) one bitstream and switches on (or in) another bitstream, in a time continuous manner. Therefore, splice points are ambiguous in that splice-in and splice-out can both be said about a switching operation, depending on which bitstream is being referred to. For the discussion provided herein, reference is generally made to only one of the bitstreams, namely, the primary network bitstream. Hence, in this particular embodiment it is the local content that will be spliced into a digital insertion location of the network bitstream. Additionally, it will be understood that the conditioning of bitstreams may be applied to both bitstreams.

The expedited splicing described herein applies a temporal independence between packets on opposite sides of a splice point. For switching from a network bitstream to a local content bitstream, the following two constraints of temporal independence relative to a splice point are applied to bitstreams at a first conditioning stage:

1) no frames of the network bitstream prior to the splice-in point temporally reference any frames in the future after the splice-in point, i.e., the last frames are either I frames, P frames, or B frames that do not temporally reference any future frames after the splice-in point (also known as the closed GOP (Group of Pictures) condition),
2) no frames of the local content bitstream after the splice-in point temporally reference any frames in the past before the splice-in point, and the first frame of the local content bitstream after the splice-in point is an I frame.

For switching from the local content bitstream back to the network bitstream, the two temporal independence above-mentioned requirements remain, except that they are applied in reverse; that is: 1) no frames of the local content bitstream prior to the splice-out point reference any frames in the future after the splice-out point, and 2) no frames of the network bitstream after the splice-out point reference any frames in the past before the splice-out point and the first frame of the network bitstream after the splice-out point is an I frame.

Additionally, in particular embodiments, at least two other requirements are required at the second splicing stage so as to achieve seamless and expedited splicing without requiring decompression of video data included in the network packets. The first requirement concerns downstream buffer levels. More particularly, the splicing apparatus is provided with the buffer levels (or the virtual buffer verifier (VBV) levels) at the splice-in and splice-out points. This ensures that the local content fits properly within the digital insertion location allotted by the conditioned bitstream. More specifically, this ensures that downstream buffer levels do not overflow or underflow as a result of local content being spliced into a digital insertion location in the conditioned bitstream. The second requirement concerns the timing of the MPEG packets. More particularly, the starting PTS (or DTS) and the end PTS (or DTS) of the local content inserted between the splice-in and splice-out points is embedded within the local content. This ensures that a downstream decoder can adjust the timebase, if necessary, and order the decoded video frames properly for subsequent display.

Figure 3:
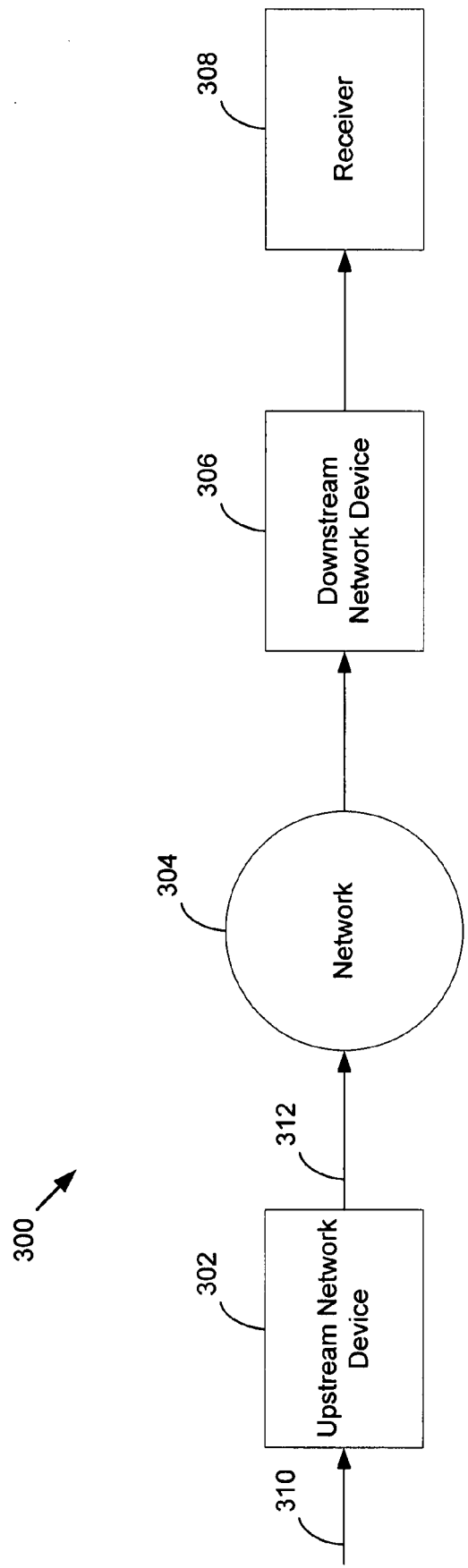
FIG. 3 illustrates an example network system for transmitting compressed video data in accordance with one embodiment.

FIG. 3 illustrates an example network system 300 for transmitting compressed video data in accordance with particular embodiments. System 300 includes an upstream network device 302 that transmits compressed video data over an IP network 304. The IP network allows digital communication between upstream network device 302 and downstream network devices 306. The network device 302 may be a central office, router, local headend or, in another embodiment, a super headend that services numerous local headends. For ease of discussion, network device 302 may be referred to as a local headend. In some network systems, a local headend may service a local geographic service area of a cable network.

Network system 300 is well-suited for use in multimedia delivery applications that use digital program insertion. By way of example, a suitable application for system 300 includes multicast or unicast video streams where local advertisement insertion or program switching by a downstream network device 306 is desirable. In these multicast or unicast video streams, pre-compressed segments of digital video and/or audio bitstreams, such as local advertisement content, replace segments of an ongoing video and/or audio program, such as a network feed. By way of example, a digital insertion location in a network feed may include network default advertisements. Downstream network device 306 may replace the network default advertisement with local advertisement content using knowledge of downstream receiver (decoder) buffer levels as well as information that describes the locations of the splice-in and splice-out points. For system 300, compressed video programs are delivered to numerous digital receivers/decoders via transmission channels progressing through network device 302 and downstream network devices, such as downstream network device 306.

Network system 300 is also suitable for real-time transmission of video data to a receiver (decoder) 308. In such systems, video content in the bitstream 310 passing through network device 302 is delivered in real-time to different end receivers/decoders 308 via network devices 306. One or more of the network devices 306 may also insert local video content in real-time before receipt by the target decoders 308. In these cases, network device 302 anticipates the insertion of local content by any one network device 306 and assists the real-time functioning of system 300.

To assist downstream digital insertion, network device 302 modifies bitstream 310 and produces a conditioned bitstream 312. Conditioned bit stream 312 is altered to facilitate downstream splicing and digital insertion. More specifically, network device 302 includes information that may be used by a downstream network device to identify digital insertion locations in the conditioned bitstream 312. These digital insertion locations are portions of conditioned bitstream 312 at which video content, such as compressed video including local advertising, may be inserted. In addition, network device 302 modifies compressed video data in bitstream 310 by removing temporal reliance between compressed video data before and after each splice-in point and before and after each splice-out point corresponding to a digital insertion location.

In one embodiment, network device 302 re-encodes video data in bitstream 310 immediately prior to and following a potential splice point such that the frames of the network bitstream before the digital insertion location meet the closed GOP condition, no frames after the splice point reference any frames before the splice point, and the first frame of the network bitstream following the digital insertion location is an I frame. In a particular embodiment, the conditioning consists of two steps, the first step is to "cleanup" a network feed before an ad comes in, i.e., produce a closed GOP condition, so that the last network frames, if they are B frames, refer only to previous frames. If the last network frames before the splice-in point are I or P frames, no action is needed. The second step is to "cleanup" the network feed after the splice-out point; that is, where the ad is to be stopped and the network signal is to be resumed. The first network frame after the splice-out point is made an I frame because it cannot reference any ad content.

In one particular embodiment, it is assumed that the first and last frame of the local (ad) content are already properly conditioned. This may be the case because local content is typically generated off-line. In another embodiment, both the local and network (aka. broadcast, multicast or unicast) content are provided in real-time. In this case, conditioning is performed in real-time for both the network and local content bitstreams. In a particular embodiment, network device 302 also packetizes the compressed video data into network layer (such as IP layer) packets for transmission onto network (such as an IP network) 304. The packetization is performed such that downstream splicing may be performed at the network packet level. It should be appreciated that a separate device other than network device 304 may perform the packetization of the compressed video data.

Network device 306 inserts local video content into bitstream 312. As a result of the modification by network device 302, downstream network device 306 that receives conditioned bitstream 312 may perform splicing on conditioned bitstream 312 without decoding or decrypting the compressed video data included therein. More particularly, providers have the advantage that they may re-encode, packetize and subsequently encrypt video data for secure transport to subscribers while allowing downstream devices (i.e., network device 306) to insert local content such as ad content without having to perform de-packetization of the network layer packets, decompression or decryption and subsequent re-encoding and re-packetization into network layer packets. In this way, providers may guarantee secure transmission of video bitstreams while enabling seamless and expedited splicing at the network layer packet level. Network device 306 is also adapted to use information (particularly sequence and timing information) embedded within higher layer packets in the incoming conditioned bitstream 312 as well as decoder buffer level information to facilitate seamless insertion of local content.

Particular embodiments described herein avoid decoding and re-encoding at the remote network devices 306. Instead, as described above, this processing is transferred to network device 302. For a network system 300 having numerous remote network devices 306 (e.g. hundreds or even thousands), this results in considerable computational savings for system 300, and may improve transmission efficiency and speed for multicast as well as unicast transmission of bitstream 310. System 300 relies on the network device 302 to perform re-encoding of compressed video data bordering digital insertion (i.e., splice-in and splice-out) locations used during transmission of bitstream 310. Thus, downstream splicing according to system 300 bypasses computationally expensive re-encoding at the remote network devices 306.

This reduces the required computational resources and complexity for each downstream network device, or allows more bitstreams to be simultaneously processed by device 306. The reduced required resources for each downstream network device reduce costs for service providers and increase flexibility in implementing a new device. For example, allowing downstream splicing in this manner reduces downstream network device costs since splicing may be performed using a simple switch of packets, and in particular embodiments, IP network layer packets. Thus, a simple switch of network packets is suitable for compressed video data splicing between conditioned bitstream 312 (a network feed) and the local content bitstream. Conditioning in this manner also allows downstream network devices to perform compressed video data switching and splicing at other network protocol layers without introducing video artifacts. In some cases, the downstream network device may not even be MPEG compliant, or compliant to the compression format used in compressing the video data. However, since no decoding or re-encoding is required in swapping packets, these non-compliant downstream network devices may still perform splicing of the local content bitstream into the conditioned network bitstream 312. Additionally, since no decryption is required, conditioning in this manner permits pre-encryption at network device 302, which removes the additional encryption costs at the network device 306 where the local ad content is inserted.

Enabling network devices 306 to insert local compressed video content into conditioned bitstream 312 without decompression of the compressed video data included therein allows regional operators (e.g., local advertisers) to provide local video content insertion without compromising video quality. In addition, allowing network device 306 to insert compressed video content as described allows frame precise splicing, thus allowing local content providers such as cable operators to increase revenue opportunity with a given advertisement avail.

Figure 4:
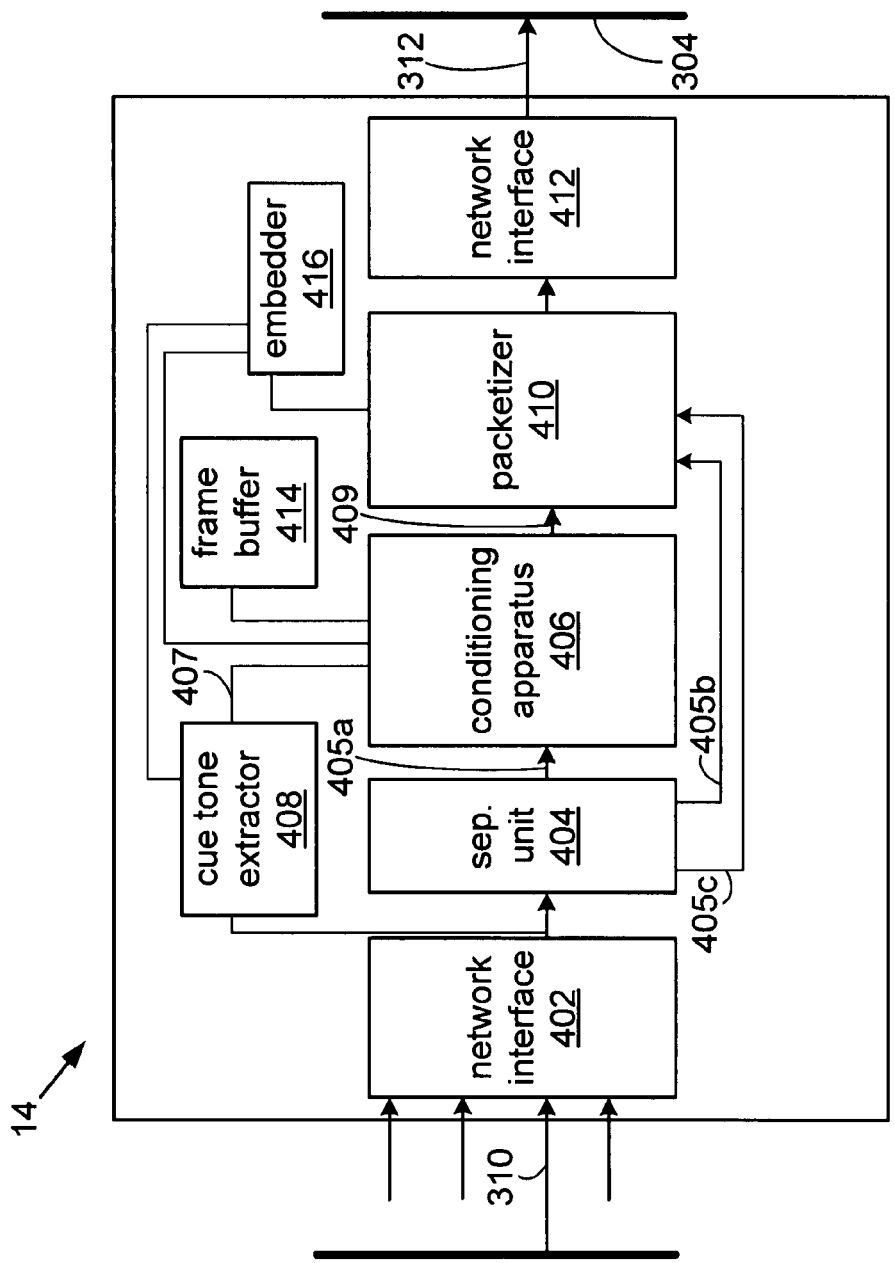
FIG. 4 illustrates a network device of FIG. 3 in more detail in accordance with a specific embodiment.

FIG. 4 illustrates network device 302 of FIG. 3 in more detail in accordance with one particular embodiment. While the network device 302 will now be described as an apparatus composed of units, those skilled in the area will recognize that the network device 302 encompasses a method, process or software having as steps the actions performed by each unit and described below. It will also be recognized that network device 302 may comprise a number of separate network devices that communicate with one another to produce conditioned bitstream 312. Network device 302 comprises a first network interface 402, separation unit 404, conditioning apparatus 406, cue-tone message extractor 408, packetizer 410, and a second network interface 412. In one particular embodiment, network device 302 is a component of a head-end conditional access system (CAS).

Network device 302 is configured to receive bitstream 310 at network interface 402. Network device 302 has a plurality of inputs included in network interface 402, which performs any network layer functions to receive bitstream 310.

One input of separation unit 404 is coupled to an output of network interface 402 to receive bitstream 310. Separation unit 404 preferably de-multiplexes bitstream 310 to obtain the compressed video data 405a included therein. This may include de-multiplexing the network layer stream (also commonly referred to as the system layer stream), removing filler packets/frames as appropriate, and other steps necessary to obtain the video bitstream containing video data 405a, the audio bitstream 405b and a data bitstream 405c from network bitstream 310. Those skilled in the art will understand the operation of the separation unit 404.

The compressed video data 405a is provided to conditioning apparatus 406. Conditioning apparatus 406 is aware of potential digital insertion locations that may be used to insert downstream video content into conditioned bitstream 312. In one embodiment, network device 302 comprises a cue-tone extractor 408 that obtains a cue-tone message 407 from bitstream 310 and uses the cue-tone message to identify digital insertion locations and their corresponding splice points in bitstream 310. Based on the known locations where downstream video content may be inserted into conditioned bit stream 312, conditioning apparatus 406 modifies compressed video data from bitstream 310 by removing temporal reliance between compressed video data before and after each splice point of the digital insertion location.

By way of example, if the first coded picture of the network bitstream 310 immediately after a splice-out point (i.e., right after the insertion of the local content bitstream) is an I frame, conditioning apparatus 406 does not recode the first coded picture immediately after the splice-out point. On the other hand, if the first coded picture immediately after the splice-out point is a P-frame frame or a B-frame, conditioning apparatus 406 re-encodes the frame to an I frame. In addition, if the last frames in the network bitstream before the splice-in point (i.e., right before the insertion of the local content bitstream) are I or P frames, nothing is done. However, if they are B frames, re-encoding will be done to remove temporal reference between the B frames and future frames (as they will be replaced by new and unrelated local content frames). In this way, no frames before the splice points reference any frames after the splice points, and vice versa.

In particular embodiments, conditioning apparatus 406 decodes and re-encodes video data 405a under MPEG-2 protocol and produces either an MPEG-2 transport stream, an MPEG-2 packetized elementary stream (PES) or an MPEG-2 elementary stream. Depending on which format is used, different processing may be implemented in packetizer 410. For simplicity, the following discussion will focus on an elementary stream produced by conditioning apparatus 406. Conditioning apparatus 406 may be a single structure or multiple structures. In one embodiment, the conditioning apparatus 406 implements ASIC basic hardware. In another embodiment where storage based multicasting of pre-encoded content is the application, conditioning apparatus 406 is implemented in software. The packetizer 410 and network interface 412 may encapsulate the MPEG elementary stream in such a way that the first data byte of the elementary stream, higher layer PES packet, higher layer MPEG transport packet, and finally higher layer network packet are all aligned. This alignment is produced at the output of the network interface 412 as conditioned bitstream 312. Frame buffer 414 communicates with conditioning apparatus 406 and stores one or more earlier coded frames that are involved in the re-encoding process.

For some bitstreams 310, cue-tone message 407 identifies the last coded frame in bitstream 310 just before a digital insertion location as well as the duration of the digital insertion content (in absolute timestamp or in number of frames). If this coded frame (or other frames before it) temporally references compressed video data after a splice-in point corresponding to the beginning of a digital insertion location, conditioning apparatus 406 re-encodes the coded frame (and any frames before it that reference video data after the splice-in point) such that temporal dependency is removed. In addition, cue-tone message 407 may identify the first coded frame in bitstream 310 just after a splice-out point corresponding to the end of a digital insertion location. If this coded frame is an I frame, nothing is done, otherwise, the bitstream is re-encoded such that the first frame after the splice-out point is an I frame. Furthermore, if any other frames after the first frame after the splice-out point temporally reference compressed video data before the splice-out point, conditioning apparatus 406 re-encodes the coded frames such that temporal dependency is removed.

In one particular embodiment, it is desirable to insert local content directly between frames of the video bitstream 310. In this embodiment, the desired digital insertion location, splice-in point and splice-out point all initially refer to the same location in bitstream 310; that is, a boundary between two successive network video frames. In this embodiment, the conditioning apparatus re-encodes the video data before and after the digital insertion location so as to meet the aforementioned first stage constraints.

In some cases, when needed, the conditioning apparatus inserts stuffing bits (i.e., elementary level stuffing bits, by way of example) into the digital insertion location between the re-encoded frames before and after the digital insertion location. In particular embodiments, the number of stuffing bits added is approximately equal to the number of bits that will be carried by the local content later spliced into the digital insertion location of the conditioned bitstream 312. In this way, the stuffing bits are used to preserve the bitrate profile of the conditioned bitstream 312 such that downstream buffer levels do not overflow or experience underflow. It will be appreciated that the insertion of stuffing bits may also be performed by the packetizer 410, as described below.

In another particular embodiment, the digital insertion location may correspond to a portion of the network bitstream that includes default network ad content. In this embodiment, the splice-in point refers to the boundary between the last network video frame before the default ad and the first frame of the default ad. Similarly, the splice-out point refers to the boundary between the last default ad frame and the first frame of the network bitstream after the default ad. The conditioning apparatus re-encodes the video data before and after each of the splice-in and splice-out points of the digital insertion location so as to meet the aforementioned first stage constraints. It will be appreciated that stuffing bits may or may not be added at this time.

The modified compressed video data 409 produced by conditioning apparatus 406 is provided to packetizer 410. Packetizer 410 performs the packetization of modified compressed video data 409 into MPEG-2 packets such that the digital insertion location splice points are each positioned at a boundary between successive packet payloads. In particular embodiments, packetizer 410 further packetizes modified compressed video data 409 into network packets, and in particular, into IP network layer packets. As a result of this packetization, downstream splicing of video content for conditioned bitstream 312 may occur by manipulating network layer packets. More particularly, downstream splicing of network packets produced by packetizer 410 may occur without de-packetization of the network layer packets, decompression of the data therein, decryption or re-encoding of the compressed video data contained in the network packets. According to particular embodiments, the network layer IP packets are further encapsulated into UDP packets, and thereafter, into RTP packets.

Packetizer 410 may also be responsible for multiplexing the modified compressed video bitstream 409, audio bitstream 405b or data bitstream 405c back into an MPEG compliant bit stream. This may also include other MPEG processing functions such as inserting stuffing bits into the bitstream as appropriate. The stuffing bits themselves may then be similarly added by packetizer 410. More particularly, filler packets containing the stuffing bits may be inserted into the intended digital insertion locations such that a bitrate profile may be preserved downstream before and after splicing.

Packetizer 410 performs encapsulation of the MPEG-2 compliant bitstream into network layer packets according to a network layer protocol, such as IP, and such that digital insertion locations are properly aligned with packet payloads of the network layer packets. In one particular embodiment, the splice point corresponds to the beginning of a digital insertion location and the packetizer 410 packetizes compressed video data after the splice point in a new network packet. In another particular embodiment, the splice point corresponds to the end of the digital insertion location and packetizer 410 places the first byte of an I frame for the elementary video stream 409 after the splice point and the first byte of the associated PES packet as the first payload byte of a new network packet. As a result of this designation, the previous PES packet containing compressed video data for conditioned bitstream 312 may rest in a network packet with considerable space left in the network packet. In this case, packetizer 410 may stuff the network packet with stuffing bits as appropriate. In another embodiment comprising IP protocol for conditioned bitstream 312, the size of the packet with considerable space left is converted to variable length to accommodate for the smaller size.

As a result of this re-packetization, digital insertion or splicing on conditioned bitstream 312 may be performed at the network layer protocol level without introducing splicing artifacts, without removal from the network layer protocol packets, and without decompression or decryption of the modified compressed video data. In addition, this allows downstream network devices such as network device 306 to perform MPEG-2 video splicing of conditioned bitstream 312 and another bitstream including compressed video data (such as a local content bitstream) without intensive MPEG level processing.

Embedder apparatus 416 is coupled to packetizer 410 and appends information describing digital insertion locations into conditioned bitstream 312. Embedder apparatus 416 may receive the information describing digital insertion locations from conditioning apparatus 406 or cue-tone extractor 408. In one particular embodiment, packetizer 410 embeds this information in an RTP packet header. As those of skill in the art will understand, IP packets may be identified via associated sequence numbers. The sequence number information may be embedded within the RTP header. In this way, the RTP header may provide the downstream device 306 with the sequence number of the IP packet corresponding to the splice-in point, the sequence number of the IP packet corresponding to the splice-out point, and/or the sequence numbers of the IP packets located in between the splice-in and splice-out points of the digital insertion location in which the splicing of the local content is to occur.

Embedder apparatus 416 may also store other information within conditioned bitstream 312. By way of example, the bitrate profile information of conditioned bitstream 312 may be included in RTP packet headers to assist downstream network device 306 in splicing content from a second bitstream into the allotted digital insertion location within the conditioned bitstream such that downstream buffers do not experience overflow or underflow. The bitrate profile information may also be used by downstream network device 306 to re-multiplex conditioned bitstream 312 with video data from another bitstream. The embedder apparatus 416 may also insert timestamp information within RTP packet headers. The timestamp information may be used to provide downstream network device 306 with timebase information that the network device 306 may use to adjust the content of a second bitstream to be insertion within a digital insertion location of conditioned bitstream 312.

The output of the packetizer 410 is provided to network interface 412. The output of network interface 412 forms the output of the network device 302, namely, conditioned bitstream 312. Network interface 302 formats the data in conditioned bitstream 312 according to the protocol on network 304 and transmits the data to a downstream network 306. In a particular embodiment, network 304 is an IP network. The medium over which network 304 is transmitted may be any one of a number of conventional transmission systems, including but not limited to xDSL, ATM/ADSL, ATM, hybrid fiber coaxial (HFC), FTTH, ISDN links, Ethernets, public data networks, T1, T3, DS-3, OC-3, wireless/terrestrial networks, digital satellites, and digital cable networks. In one particular embodiment, conditioned bitstream 312 is transmitted in real-time. The network interface 412 may be a suitable transmitter for any of those known in the art for the above transmission systems. In a particular embodiment, the network interface 412 is suitable for transmission onto an IP network.

Figure 5:
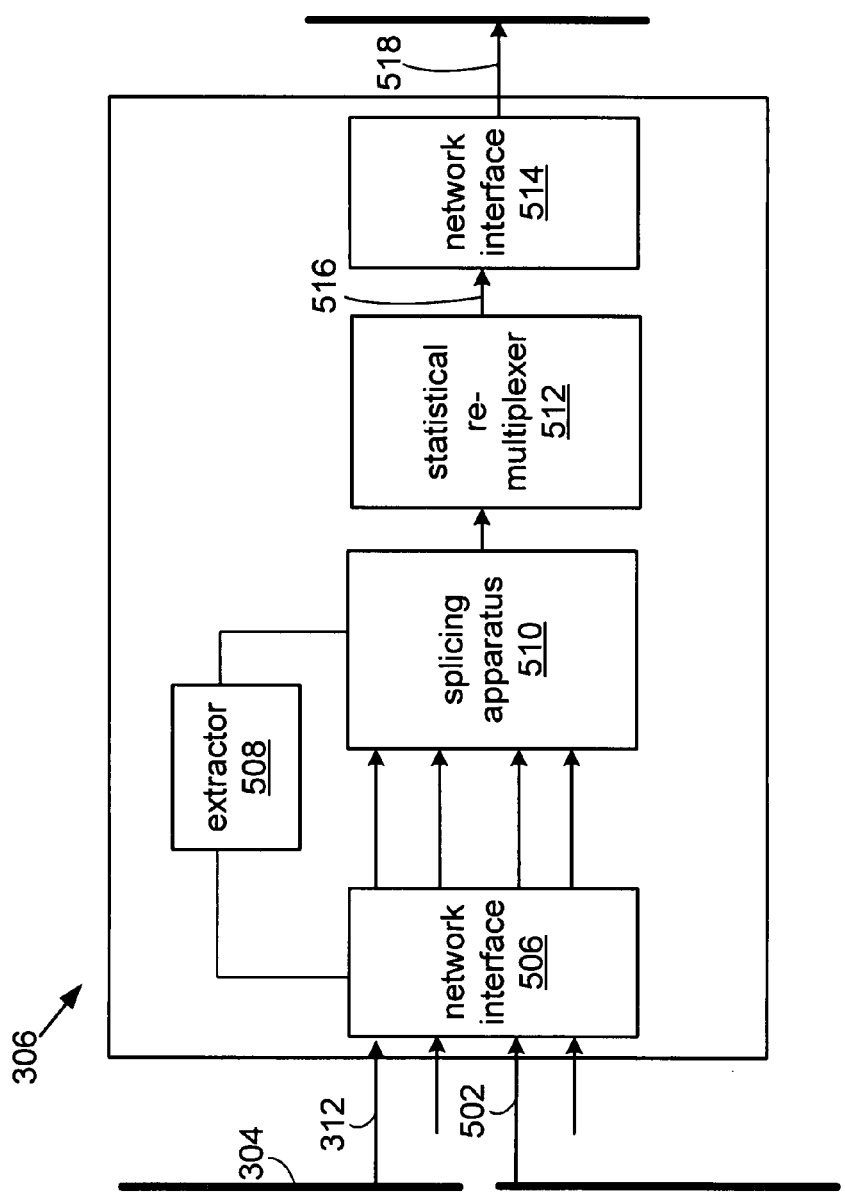
FIG. 5 illustrates another network device of FIG. 3 in more detail in accordance with one embodiment.

FIG. 5 illustrates downstream network device 306 of FIG. 3 in more detail in accordance with one particular embodiment. Network device 306 combines video data from two bitstreams 312 and 502 to form an output bitstream 518. Network device 306 comprises a first network interface 506, extractor 508, a splicing apparatus 510, a statistical re-multiplexer 512, and a second network interface 514. By way of example, downstream network device 306 may be associated with an edge quadrature amplitude modulation device (eQAM), such as that manufactured by Cisco Systems, Inc. of San Jose, Calif. It will be recognized by those of skill in the art that network device 306 may comprise a number of separate network devices that communicate with one another to produce output bitstream 518.

Network interface 506 has a plurality of inputs to receive bitstreams from a variety of input sources. In various embodiments, network interface 506 is configured to receive one of IP, ATM, frame relay, and SONET packets. In one particular embodiment, network interface 506 is configured to receive compressed video data packetized into IP, UDP and RTP packets. For system 300 of FIG. 3, network interface 506 receives conditioned bitstream 312 from IP network 304. Network interface 506 also receives a second bitstream 502 from a local channel. The second bitstream 502 comprise may comprise local content such as advertising content to be inserted into conditioned bitstream 312. Network interface 506 includes a plurality of outputs that provide bitstreams to splicing apparatus 510.

Extractor 508 is coupled to network interface 506 and splicing apparatus 510. Extractor 508 obtains information within conditioned bitstream 312 that identifies one or more digital insertion locations suitable for inserting local video content within conditioned bitstream 312. By way of example, in one particular embodiment, extractor 508 may obtain information from an RTP packet header that identifies a digital insertion location in the conditioned bitstream 312 by providing the specific sequence numbers of IP packets corresponding to the digital insertion location. More particularly, the RTP header may provide the sequence number of the last IP packet before the splice-in point, the first IP packet after the splice-out point and/or the sequence numbers of the IP packets within the digital insertion location defined by associated splice-in and splice-out points in the conditioned bitstream 312. In one particular embodiment, the sequence information is embedded in the stream positioned well in advance of an associated digital insertion location. The splice in/out point is identified by the RTP sequence number. In another embodiment, the control information is sent to the splicing apparatus 510 out of band.

The control information may also provide decoder buffer and bitrate profile information corresponding to the conditioned bitstream 312. More particularly, the control information may contain information describing the decoder buffer profile of the data at a digital insertion location of the conditioned bitstream. Furthermore, the RTP header may also provide timing information such as timestamps that splicing apparatus 510 may use to adjust the timebase of the compressed video data from the second bitstream.

Splicing apparatus 510 splices compressed video data from the second bitstream 502 into the compressed conditioned bitstream 312. Splicing (also known as bitstream concatenation) is a process that essentially replaces part of a first digital compressed bitstream with a second compressed bitstream. Splicing may also be viewed as multiplexing a first and second digital compressed bitstream or as combing a first compressed bitstream with a second digital compressed bitstream. In many cases, the second compressed bitstream may have been encoded off-line in a different location or at a different time. By way of example, second bitstream 502 may comprise local advertisement content produced by a local content provider.

Splicing generally includes a series of transitions made between the first bitstream and the second bitstream. Each transition is referred to as a splice point. Since there is no temporal dependency between packets on opposite sides of the splice points in conditioned bitstream 312, splicing apparatus 510 may splice the second bitstream 502 into conditioned bitstream 312 without re-encoding the video data in either bitstream 312 or 502. More particularly, since conditioned bitstream 312 has been previously re-encoded to remove temporal relationships between video data before and after the splice-in and splice-out points corresponding to the digital insertion locations, splicing of the two bitstreams 312 and 502 may be performed seamlessly without re-encoding of data within bitstream 312.

Splicing in accordance with particular embodiments occurs between network packets (i.e., IP packets) of multiple bitstreams. Since the splice points for digital insertion have already been identified (via information obtained by extractor 508), and since the splice points are located between network packets, splicing apparatus 510 may perform seamless splicing of network packets without de-packetizing the compressed video data within the network packets.

Splicing on a network packet level according to network device 306 may then occur without extracting or decrypting compressed video data from network packets and/or decoding and re-encoding compressed video data—for either compressed bitstream being spliced together. For a network device such as network device 306, the reduced complexity in not having to decode video frames is significant. As a result, a network feed may then be spliced with the local content without introducing significant computational complexity and/or requiring additional decoding hardware. In this case, network device 306, which is configured for IP switching and not MPEG switching, then becomes capable of MPEG content splicing. The computational savings are even more pronounced when network device 306 is required to repeatedly process and transmit large numbers of bitstreams in a limited time. The output of splicing apparatus 510 is an output bitstream comprising the compressed video data from conditioned bitstream 312 and the compressed video data in the second bitstream 502.

According to particular embodiments, a combiner within splicing apparatus 510 splices portions of a second bitstream 502 (also referred to as the local content bitstream) into digital insertion locations in conditioned bitstream 312 while ensuring that downstream buffers at the decoders do not overflow or underflow. By way of example, a decoder may be present in a receiver 308 such as a set top box (STB) in a viewer's residence or other subscriber location. FIG. 6A illustrates a portion of second bitstream 502 comprising local content packets 602. FIG. 6B illustrates conditioned network bitstream 312 comprising network IP packets 604. FIG. 6B also illustrates a digital insertion location 606 having splice-in and splice-out points 608 and 610, respectively. Digital insertion location 606 contains dummy packets (also referred to as replaceable packets) 612, in contrast to the other network IP packets 604, which contain compressed video data.

Ensuring that there is no buffer level overflow or underflow generally implies ensuring that the bitrate of the spliced bitstream remains within a suitable tolerance range. It should be noted that, conventionally, the splicing apparatus may ascertain the bitrate profile, and hence the buffer level, from the bitstream itself. However, this may require that the splicing apparatus de-packetize the network packets and extract information embedded within the compressed bitstream. Removing the compressed video data from the network packets is undesirable as it requires increased computational complexity and resources at the splicing apparatus. Furthermore, the network packets may be encrypted, thus adding to computational time. As described earlier, encryption is becoming increasingly desirable to ensure quality video delivery for downstream subscribers.

To ensure seamless splicing, there should be no buffer level overflow or underflow at a receiving decoder. In one particular embodiment, a suitable buffer level is achieved by means of adjusting the bitrate of the local content to be inserted from the second bitstream 502 so as to approximately fit the bitrate profile of the digital insertion location in the conditioned bitstream 312. More particularly, in this embodiment, a virtual buffer verifier (VBV) is used to model the downstream decoder buffer level. The virtual buffer levels at the splice-in and splice-out points corresponding to the digital insertion location are predetermined. By way of example, it may be desirable to maintain the virtual buffer level close to approximately 80% of its capacity. More particularly, in particular embodiments it may be desirable to maintain the virtual buffer level within a suitably narrow tolerance range. In other embodiments, it may be desirable to maintain a different buffer level.

The splicing apparatus 510, or more particularly a transcoder within splicing apparatus 510, adjusts the local content video data so as to generally match the allotted bitrate profile defined by the video data within the digital insertion location of conditioned bitstream 312. More particularly, in a specific embodiment, in order to prevent overflow or underflow of the buffer levels, the bitrate of the inserted local content from the second bitstream 502 is forced to match the bitrate of whatever the splicing apparatus removes from the conditioned bitstream 312 (i.e., the dummy packets). If the bitrate does not match, the transcoder either transcodes the local content video data to achieve a lower bitrate if the bitrate for the local content is too large, or adds stuffing bits to the local content if the bitrate for the local content is too small. It should be noted that the splicing apparatus does not decode or re-encode the compressed data in the conditioned network stream 312. Furthermore, the splicing apparatus does not de-packetize the network packets in the conditioned bitstream.

In the VBV model, each time a picture is decoded, the buffer level decreases by a corresponding amount. Consequently, the bigger the size of the picture decoded, the more the buffer level will decrease. If the bitrate is too high, the virtual buffer level will increase too fast between decoded pictures. Similarly, if the bitrate is too low, the virtual buffer level will decrease too fast between decoded pictures. Hence, in one particular embodiment, if the buffer level is too high, the sizes of the pictures of the local content are increased. This may be accomplished by inserting stuffing bits into the pictures. Conversely, if the bitrate is too low, the sizes of the pictures of the local content may be decreased. This may be accomplished by transcoding the pictures of the local content.

In a second particular embodiment, overflow or underflow of buffer levels may be prevented through the inclusion of a signal that is transmitted from the decoder to the splicing apparatus 510, or more particularly the transcoder within the splicing apparatus 510, that provides the splicing apparatus with the current buffer level. By way of example, the buffer level may be monitored continuously, at predetermined intervals, or at other suitable time points. In this way, the transcoder may adjust the bitrate of the inserted local content video data from the second bitstream 502 so as to maintain a suitable buffer level downstream at the decoder(s) via buffer level information received from the decoder.

An embedder within splicing apparatus 510 may also insert timing information within the inserted local content. Generally, when two independently encoded video bitstreams are spliced together, their timebases will often be independent. If no change is done to the timebase, the resultant output bitstream may have a discontinuous timebase. This may result in improper ordering of video frames at the decoder. There are a number of ways to deal with this situation. In one embodiment, splicing apparatus 510 adjusts and inserts presentation time stamps (PTS) or decoding time stamps (DTS) into the inserted local content such that the timebase becomes continuous with conditioned bitstream 312. These timestamps also serve to inform a decoder in a downstream receiver 308 where and in what order to position the local content video data relative to the video data from conditioned bitstream 312.

In another embodiment, the embedder within the splicing apparatus 510 sets flags in the MPEG transport layer that indicate that there is a discontinuity in the timebase. More particularly, a PCR (timebase) discontinuity indication may be added to the local content before the splice-out point so as to meet the 500 ns MPEG specification for PCR jitter. A decoder in a receiver 308 may then recognize the PCR discontinuity indication in a packet header and properly reset its clock to track to the new timebase.

In particular embodiments, a packetizer within splicing apparatus 510 packetizes the adjusted local content video data into network layer packets. In one particular embodiment, the adjusted local content video data is packetized into IP network layer packets. Additionally, in one particular embodiment, the timing information is embedded within a packet header, such as an RTP packet header, within the local content.

The output 516 of splicing apparatus 510 is fed into statistical re-multiplexer 512. Statistical re-multiplexer 512 may combine spliced output bitstream 516 with one or more other bitstreams for subsequent delivery to a target receiver 308, such as a set-top box. Statistical re-multiplexer 512 may make use of virtual buffer level information or physical buffer level information received from the decoder at receiver 308 in order to re-multiplex the bitstreams. The output of the statistical re-multiplexer 512 is provided to network interface 514, which is coupled to receiver 308 over an appropriate medium. The output of network interface 514 forms the output of downstream network device 306, namely, output bitstream 518. Network interface 514 formats the data in output bitstream 518 according to the protocol on the medium and transmits the output bitstream 518 to receiver 308, which may be a set-top box in a home. In one embodiment, output bitstream 518 is transmitted in real time. The network interface 514 may be a transmitter for any of those known in the art for IP networks, DSL networks or ATM networks, by way of example. FIG. 6C illustrates a portion of output bitstream 518 after insertion of local video content packets 602 into a digital insertion location 606 of conditioned bitstream 312 by network device 306.

Figure 7:
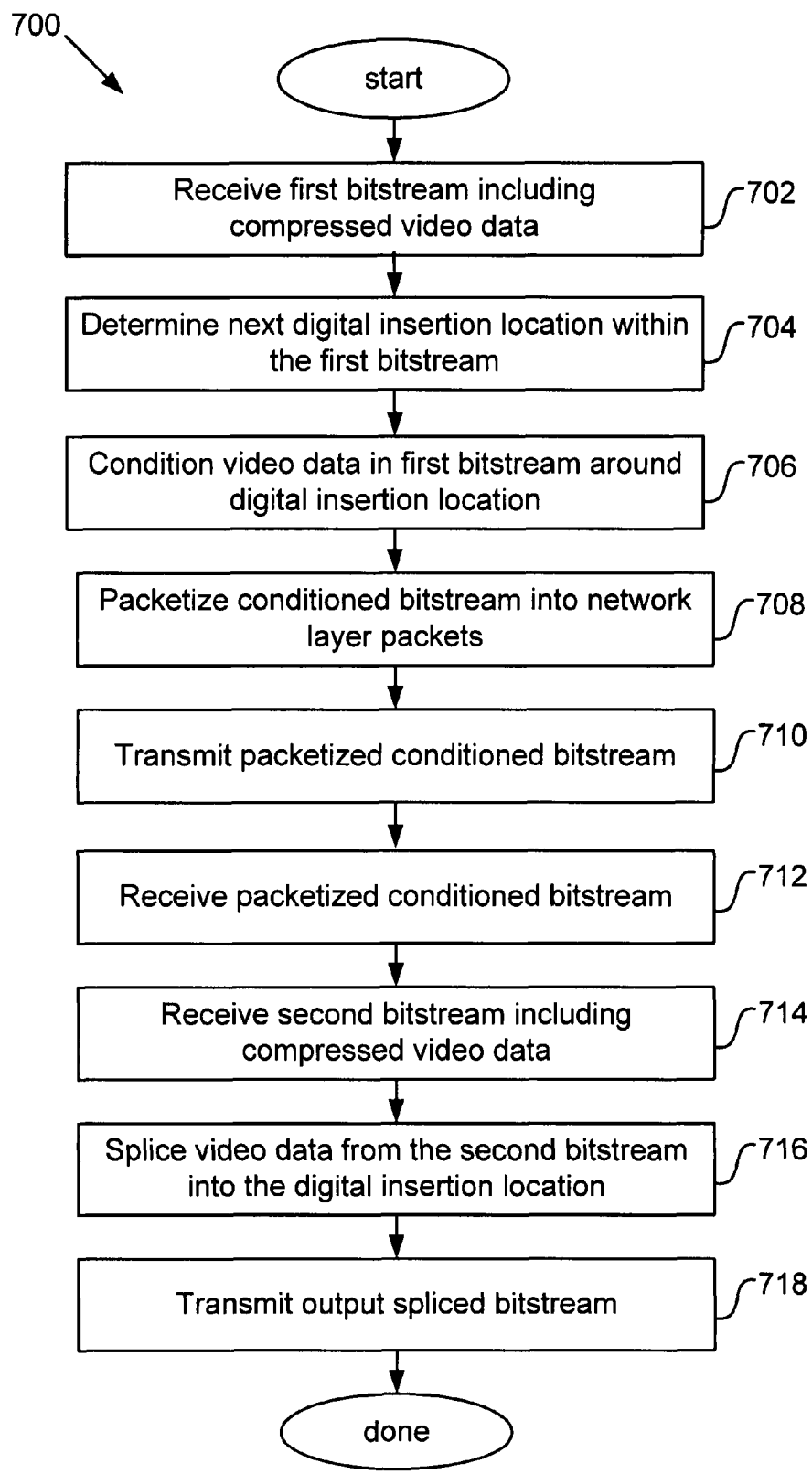
FIG. 7 illustrates a process flow for providing an output bitstream in accordance with one embodiment.

FIG. 7 illustrates a process flow 700 for providing an output bitstream onto a channel in accordance with one embodiment. In a particular embodiment, process flow 700 takes place in network devices associated with an IP network (i.e., a network adopting internet protocol). First, a network bitstream including compressed video data is received 702 at a first upstream network device. The location of a desired digital insertion location within the bitstream is then determined 704. The video data in the network bitstream is then conditioned 706 around the splice-in and splice-out points corresponding to the digital insertion location. More particularly, the frames around the splice-in and splice-out points are conditioned so as to meet the first stage constraints described above. Furthermore, dummy packets may be inserted between the splice-in and splice-out points so as to enable a downstream splicer to swap/insert local replacement content into the conditioned bitstream in place of the dummy (replaceable) packets. The conditioned bitstream is then packetized 708 into network layer packets. The packetized conditioned network bitstream is then transmitted 710 over a network.

The packetized conditioned bitstream is then received 712 at a downstream network device. A local content bitstream is also received 714 at the downstream network device. Network packets including compressed video data from the local content bitstream are then combined (spliced) 716 within the network packets of the conditioned bitstream. More particularly, the network packets including the local compressed video data and timing information are spliced into the digital insertion location within the conditioned bitstream. In one embodiment, network packets including compressed video data from the second bitstream are multiplexed into the digital insertion location of the packetized conditioned network bitstream. In essence, network packets of the local content bitstream are swapped in for network packets of the conditioned network bitstream. The resultant spliced bitstream is then output onto a channel and transmitted 718 to a receiver.

Figure 8:
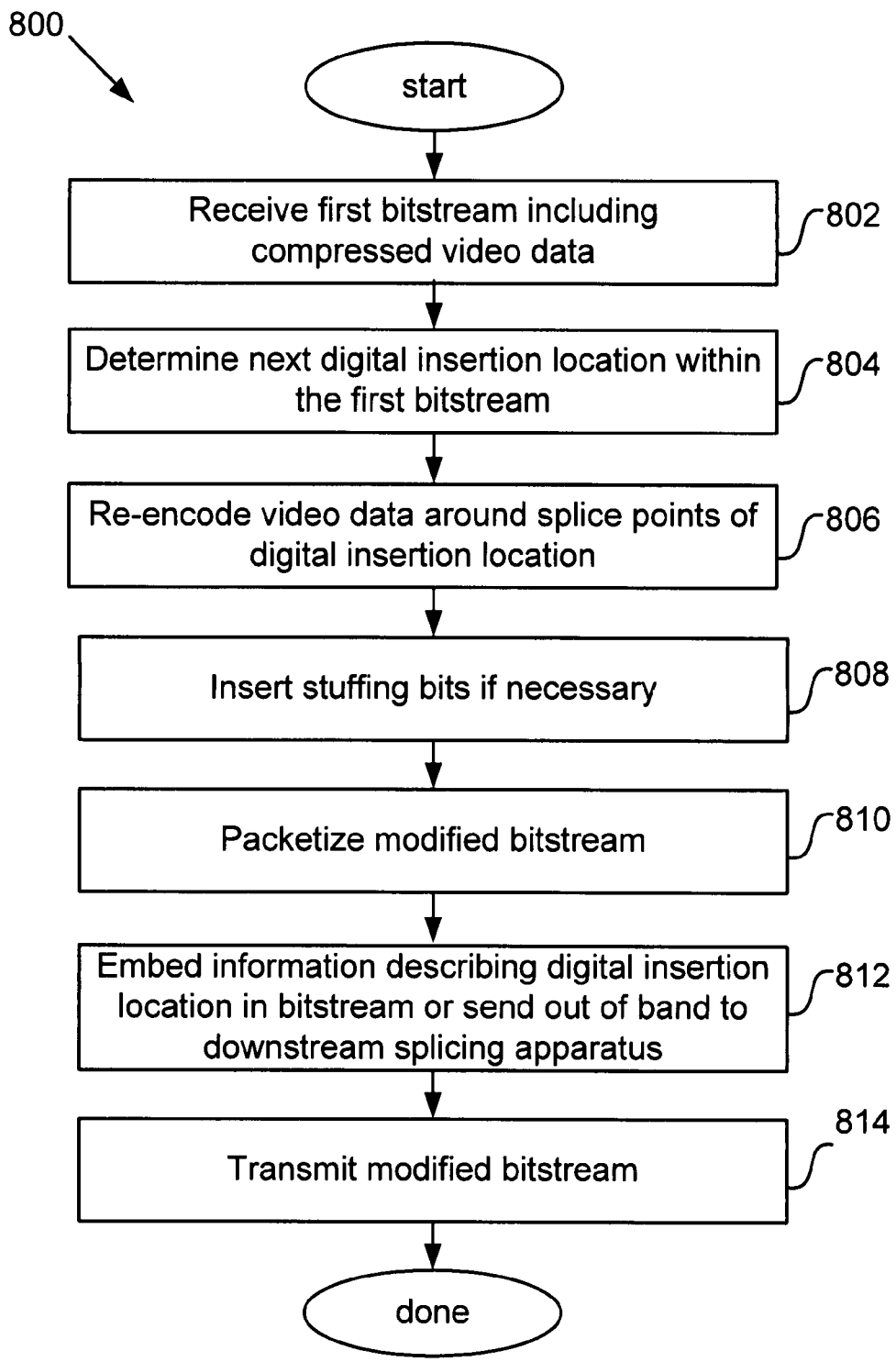
FIG. 8 illustrates a process flow for conditioning a compressed bitstream in accordance with one embodiment.

FIG. 8 illustrates a process flow 800 for providing a conditioned bitstream comprising compressed video data. Process flow 800 may take place in any suitable network device such as the network device 302 of FIG. 4. Processes in accordance with particular embodiments described herein may include up to several additional steps not described or illustrated here in order not to obscure the present invention. While compressed video bitstream processing will now be described as a method, those skilled in the art will recognize that the present invention encompasses a system or software having units capable of performing the actions as described below.

Process flow 800 begins by receiving 802 a first bitstream including compressed video data. In particular embodiments, the first bitstream is a network bitstream for use in multicast or unicast broadcasting. Upon receiving the bitstream at a headend or any other suitable network device, the network device may then store the video data on local memory, remove the compressed data from the bitstream, e.g., by unpacking the compressed video data from network packets, or otherwise prepare the data for processing.

One or more digital insertion locations within the bitstream are then determined 804. In one embodiment, a cue-tone extractor obtains a cue-tone message from the bitstream and uses the cue-tone message to identify splice points associated with the one or more digital insertion locations.

Based on known locations of potential splice points where downstream video content from a second bitstream may be inserted into the first bitstream, compressed video data within the first bitstream may be modified. More specifically, re-encoding 806 compressed video data around each splice point may be performed such that temporal reliance between compressed video data before the splice point and compressed video data after the splice point is removed. The process of re-encoding around digital insertion locations is repeated for each digital insertion location in the first bitstream.

In particular embodiments, re-encoding of frames around a splice point may include decoding and re-encoding according to conventional MPEG techniques. MPEG decoding comprises processing the compressed video data with inverse transform coding, de-quantization, and VLC decoding. After transform coding and quantization, each image is decoded comprising de-quantization and inverse transform coding before motion compensation using motion vectors extracted from the bitstream. The motion compensation process sums the residual picture data with the picture data in the frame buffer to result in updated frame picture in the frame buffer. The motion vectors can also be reused to encode the frame in the frame data into another output compressed bitstream. This process of motion compensation including adding the motion vectors to the video data and encoding produces modified compressed video data relative to that as received. The product of the re-encoding process is modified compressed video data. More particularly, re-encoding proceeds according to the first stage constraints described above; namely, that 1) no frames of the first bitstream prior to the splice-in point before the digital insertion location reference any frames in the future after the splice-in point, i.e., the last frames are either I frames, P frames, or B frames that do not reference any future frames after the splice-in point, and 2) that no frames of the first bitstream after the splice-out point reference any frames in the past before the splice-out point and that the first frame of the network bitstream after the splice-out point is an I frame.

In one particular embodiment, it is desirable to insert local content from the second bitstream directly between two successive frames of the first bitstream. In this embodiment, dummy (stuffing) bits are inserted 808 into the digital insertion location between the re-encoded (if necessary that is) frames before and after the digital insertion location. In particular embodiments, the number of stuffing bits added may be approximately equal to the number of bits that will be carried by local content from a second bitstream later spliced into the digital insertion location of the conditioned first bitstream. In this way, the stuffing bits are used to preserve the bitrate profile of the conditioned bitstream such that downstream buffer levels do not overflow or experience underflow. It will be appreciated that the insertion of stuffing bits may also be performed during packetization of the conditioned bitstream, as described below.

In another particular embodiment, the digital insertion location may correspond to a portion of the first bitstream that includes default content, such as default network ad content. In this embodiment, dummy bits may or may not be inserted into the digital insertion location.

The conditioned compressed video data may then be packetized 810. More particularly, in particular embodiments, the modified compressed video data is first packetized into MPEG-2 packets such that the digital insertion location splice points each are inserted into a new MPEG-2 packet payload. The conditioned bitstream is then further packetized into network packets, such as IP network packets. Higher level packetization may also occur. By way of example, the conditioned bitstream may also be packetized into UDP and RTP packets or into still other higher level protocols. As a result of this packetization, downstream splicing of video content into the conditioned bitstream may occur by manipulating network packets. Downstream splicing of network packets may thus occur without de-packetization of the network packets, decompression of the video data included therein, decryption or re-encoding of the compressed video data contained in the network packets. As noted above, stuffing bits may also be inserted into the digital insertion locations during packetization of the conditioned bitstream. It should be noted that the stuffing bits added into the digital insertion locations for later swapping are also packetized into network packets.

Information describing digital insertion locations may then be embedded 812 into the conditioned bitstream or sent out of band to the splicing apparatus. It should be noted that the packetizer may be used to embed the digital insertion location information into the conditioned bitstream. As such, steps 810 and 812 may occur concurrently. As those of skill in the art will understand, IP packets may be identified via associated sequence numbers. The sequence number information is included in the RTP header. In this way, the RTP header may provide a downstream splicing device with the sequence number of the IP packet corresponding to the splice-in point, the sequence number of the IP packet corresponding to the splice-out point and/or the sequence numbers of the IP packets between the splice-in and splice-out points of the digital insertion location in which the splicing of the local content is to occur.

The embedding 812 may also include inserting bitrate information and/or timing information within the conditioned bitstream or send the information out of band to splicing apparatus. The bitrate and information may be used by a downstream network device, such as network device 306, to adjust the bitrate of video data to be inserted into the digital insertion locations from secondary bitstreams. The timing information may be used by the network device 306 when inserting timing information into the inserted content.

The product of process flow 800 is a packetized conditioned bitstream that comprises the modified compressed video and may include information describing the digital insertion locations. This conditioned bit stream may be stored or formatted for transmission 814 onto a network (such as an IP network), as described above.

Figure 9:
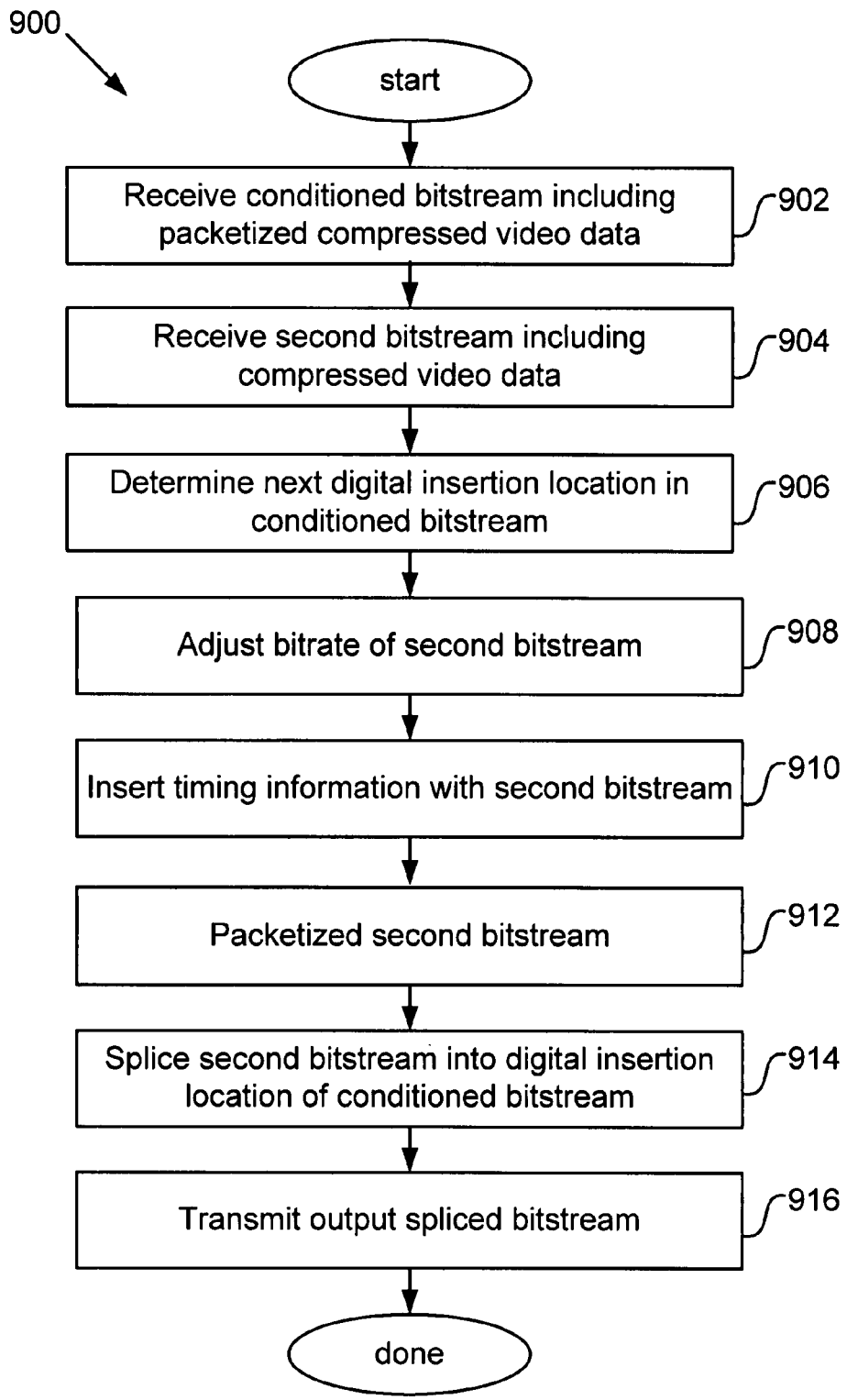
FIG. 9 illustrates a process flow for providing an output bitstream comprising portions of a conditioned bitstream and a second bitstream in accordance with one embodiment.

FIG. 9 illustrates a process flow 900 for providing a bitstream onto a channel in accordance with one particular embodiment. The process flow 900 may take place in any suitable network device such as the network device 306 of FIG. 5. Processes in accordance with process flow 900 may include up to several additional steps not described or illustrated here in order not to obscure the present invention.

Process flow 900 begins by receiving 902 a first conditioned bitstream comprising packetized compressed video data and one or more digital insertion locations. A second bit stream comprising compressed video data is also received 904. In one particular embodiment, the video data from the second bitstream corresponds to local content to be inserted into the one or more digital insertion locations in the first conditioned bit stream. In one embodiment, the network device receives the second bitstream first and stores the video data from the second bitstream in local memory until the conditioned bitstream is received.

One or more digital insertion locations within the conditioned bitstream are then determined 906. According to particular embodiments, the conditioned bitstream is packetized into IP network packets and also into higher level RTP packets. In these embodiments, the information describing the locations of the digital insertion locations may be located within the stream positioned well in advance of associated digital insertion locations. More particularly, the embedded information may provide the sequence numbers of the IP packets associated with the digital insertion locations in the conditioned bitstream. By way of example, the RTP header may provide the sequence number of the last IP packet before the splice-in point and the first IP packet after the splice-out point in the conditioned bitstream 312. In another embodiment, the RTP header may provide the sequence numbers of the IP packets that comprise the digital insertion location (i.e., the IP packets that are to be swapped out for local content packets).

To ensure seamless splicing of the second bitstream into the first conditioned bitstream, process flow 900 ensures no buffer level overflow or underflow at downstream decoders.

In one particular embodiment, a suitable buffer level is achieved by means of adjusting 908 the bitrate of the local content to be inserted from the second bitstream so as to approximately fit the bitrate profile of the digital insertion location in the conditioned bitstream. In one particular embodiment, the local content video data is adjusted so as to generally match the allotted bitrate profile defined by the video data within the digital insertion location of the conditioned bitstream. More particularly, in one particular embodiment, in order to prevent overflow or underflow of the buffer levels, the bitrate of the inserted local content from the second bitstream is forced to match the bitrate of whatever the splicing apparatus removes from the conditioned bitstream. If the bitrate does not match, the local content video data may be transcoded to achieve the necessary bitrate if the bitrate required by the local content is too large; conversely, stuffing bits may be added to the local content if the bitrate required by the local content is too small.

Timing information is inserted 910 within the inserted local content. In one particular embodiment, presentation time stamps (PTS) or decoding time stamps (DTS) are adjusted/inserted into the inserted local content such that the timebase of the local content becomes continuous with that of the conditioned bitstream. These timestamps also serve to inform a decoder in a downstream receiver where and in what order to position the local content video data relative to the video data from the conditioned bitstream. In another embodiment, a PCR (timebase) discontinuity indication may be added to the local content before the splice-out point so as to meet the 500 ns MPEG specification for PCR jitter. A decoder in a receiver 308 may then recognize the PCR discontinuity indication in a packet header and properly reset its clock to track to the new timebase.

In particular embodiments, the adjusted local content video data is packetized 912 into network layer packets. In one particular embodiment, the adjusted local content video data is packetized into IP network layer packets. Additionally, in one particular embodiment, the timing information is embedded within a packet header, such as an RTP packet header, within the local content.

Network packets including local video content from the second bitstream and supplementary information are then combined (spliced) 914 at the network layer packet level with the network packets from the conditioned bitstream. More particularly, the network packets including the local compressed video data and timing information are spliced into the digital insertion location within the conditioned bitstream. In one embodiment, the network packets including local content from the second bitstream and supplementary information are multiplexed into an associated digital insertion location within the conditioned bitstream. Hence, the local content network packets are spliced into the conditioned bitstream in place of network packets comprising an associated digital insertion location in the conditioned bitstream. Again, the splicing does not include decoding or re-encoding the compressed data in the conditioned network stream. Furthermore, the splicing apparatus does not include de-packetizing the network packets in the conditioned bitstream.

In one particular embodiment, to ensure seamless splicing, the downstream decoder buffer levels may be monitored before, during and after splicing. In this embodiment, the local video content may be adjusted in real-time so as to prevent overflow or underflow of downstream buffer levels.

In another particular embodiment, a virtual buffer is used to model the downstream decoder buffer level. According to this embodiment, the buffer levels at the splice-in and splice-out points of the associated digital insertion location may be predetermined. In this embodiment, the bitrate profile of the local content is adjusted so as to produce the desired buffer levels at the splice-in and splice-out points corresponding to the digital insertion location.

The splicing provides an output bitstream comprising compressed video data included in the conditioned bitstream and the compressed video data included in the second bitstream. The output bitstream is then transmitted 916 onto a channel.

Although the present invention has been primarily described with respect to splicing together compressed video data provided by local advertising with compressed video data provided by a network provider during transmission, the present invention is not limited to the scenario described above and may include combining two more bitstreams from any sources at any point in data transmission. Thus, the compressed video data spliced together may include compressed video data from any two separate compressed video data bitstreams received at a network device.

In addition, in all the figures and discussions for the present invention, it is important to note that the channels are bi-directional, even though the present invention is described and shown by focusing on a single direction for ease of understanding. The present invention focuses on the transmission in a direction from the network device 302 to the network device 306. Thus, a network interface acting as a transmitter within network device 306 may also act as a receiver in the reverse direction, e.g., from network device 306 to network device 302 of FIG. 3, by way of example).

The methods of this present invention may be implemented on various systems. For example, the invention may be implemented on routers and/or switches. In a specific embodiment, the systems of this invention may be specially configured routers such as, for example, specially configured router models 1600, 2500, 2600, 3600, 4500, 4700, 7200, and 7500 available from Cisco Systems, Inc. of San Jose, Calif. A general architecture for some of these machines will be given below. In an alternative embodiment, the methods of this invention may be implemented on a video streaming server, or a general-purpose network host machine such as a personal computer or workstation. Further, the invention may be at least partially implemented on a card (e.g., an interface card) for a network device or a general-purpose computing device.

Generally, the techniques of the present invention may be implemented on software and/or hardware. In a specific embodiment of this invention, the technique of the present invention may be implemented in software such as an operating system or in an application running on an operating system. A software or software/hardware hybrid system of this invention is preferably implemented on a general-purpose programmable machine. Such a programmable machine may be a network device designed to handle network traffic. Such network devices typically have multiple network interfaces. One important class of device that may be used to implement the present invention is the Cable Modem Termination System.

Figure 10:
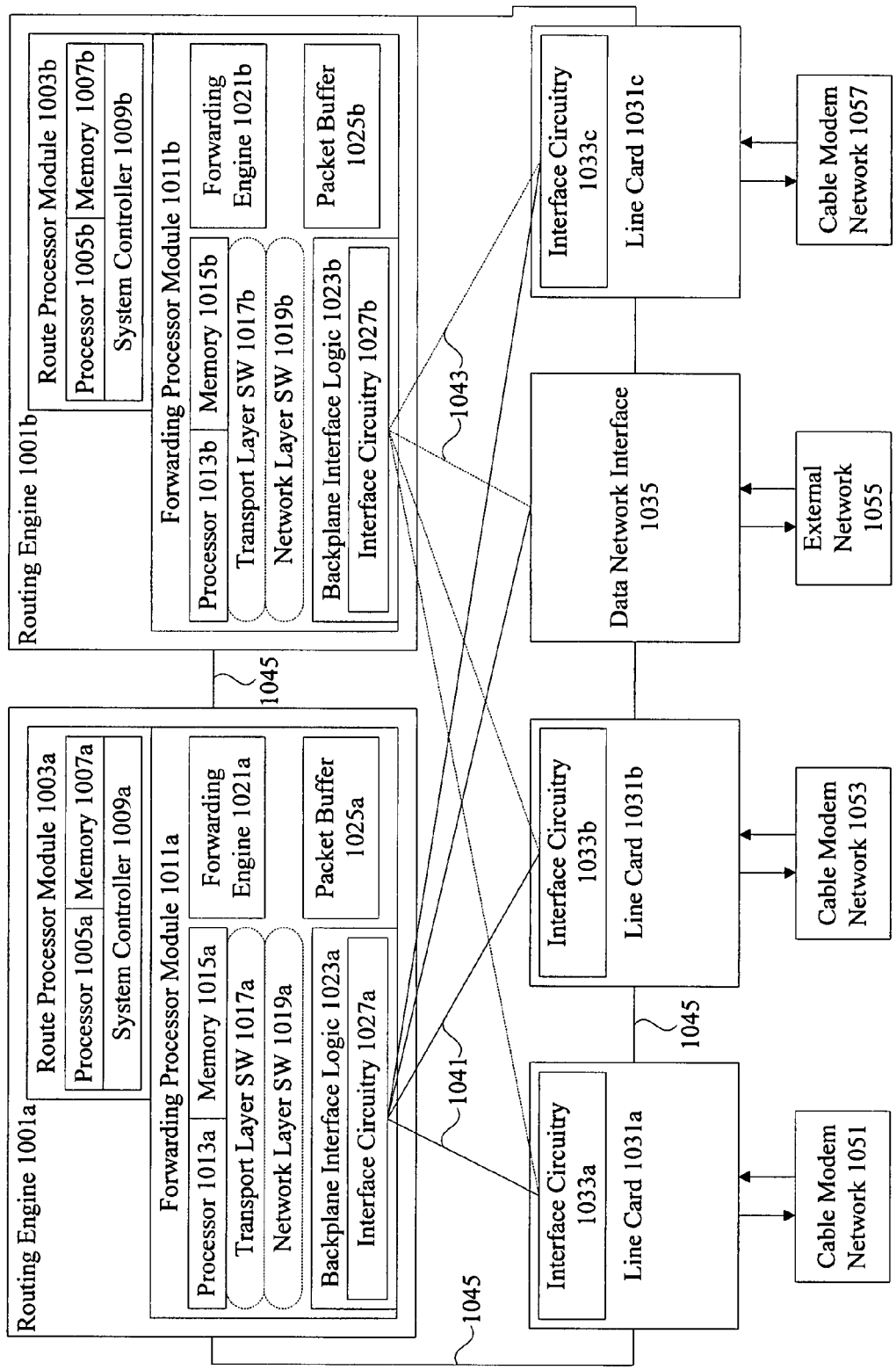
FIG. 10 shows a block diagram of a specific embodiment of a Cable Modem Termination System (CMTS) which may be used to implement particular embodiments.

FIG. 10 shows a block diagram of a specific embodiment of a Cable Modem Termination System (CMTS) 1000 which may be used to implement certain aspects of the present invention. As shown in FIG. 10, the CMTS 1000 may comprise a plurality of routing engines (e.g. 1001*a*, 1001*b*).

Each of the routing engines may include a variety of similar modules and/or components. According to a specific embodiment, Routing Engine A may be configured or designed to include a plurality of functionally different modules or components, including, for example, a Forwarding Processor (FP) Module 1011*a* adapted to provide packet forwarding functionality; a Route Processor (RP) Module 1003*a* adapted to implement routing or forwarding operations; a utility component 1002a adapted to provide system clock and timestamp functionality; etc. The routing engine components provide may be configured to provide layer one, layer two, layer three and layer four functionality as well as quality of service (QoS) functionality.

According to a specific implementation, the RP Module 1003a may be configured as a processor-based routing system comprising functionality incorporated within a typical router, such as, for example, specially configured router models 1600, 2500, 2600, 3600, 4500, 4700, 7200, 7500, 10012, and 12000 available from Cisco Systems, Inc. of San Jose, Calif. For example, as shown in the embodiment of FIG. 10, the RP Module 1003a comprises a general-purpose processor 1005a (e.g., a MIPS route processor) coupled to a system controller 1009a and memory 1007a.

The memory 1007a may comprise synchronous dynamic random access memory (SDRAM) storage locations addressable by the processor 1005a for storing software programs, video data, and data structures accessed by the components. A network routing operating system, portions of which may reside in memory and executed by the route processor, functionally organizes the router by invoking network operations in support of software processes executing on the router.

The RP processor 1005a may be configured to construct and load routing tables used by the FP Module 1011a. The processor 1005a may also be configured or designed to perform configuration management functions of the routing engine 1001a, and to communicate with neighboring peer, standby, and/or backup routers to exchange protocol data units used to construct the routing tables in accordance with conventional routing algorithms. It will be apparent to those skilled in the art that other memory types, including various computer readable media, may be used for storing and executing program instructions pertaining to the operation of the routing engine.

Interface circuitry 1027a may be coupled to the respective interface circuitry 1033a, 1033b of line cards 1031a, 1031b. According to various embodiments, the FP Module 1011 may comprise a processor 1013a and memory 1015a for handling transport layer 1017 and network layer 1019 functionality. The FP Module 1011a may also be configured to provide transaction compacting functionality, data parcel tunneling functionality, video data transmission functionality, etc.

According to different embodiments of the present invention, one or more of the routing engines may be configured to communicate with a plurality of line cards (e.g. 1031, 1035) via point-to-point links. For example, as shown in FIG. 10, each of the plurality of line cards 1031 and 1035 are connected to each of the routing engines 1001a, 1001b via point-to-point links 1041 and 1043. One advantage of the point-to-point link configuration is that it provides additional reliability in that the failure of one or more line cards will not interfere with communications between other line cards and the routing engine(s). For example, if Line Card A 1031a suddenly failed, each of the routing engines would still be able to communicate with the other line cards.

The techniques of the present invention may be implemented on various general purpose Cable Modem Termination Systems. In a specific embodiment, the systems of this invention may be specially configured CMTSs such as, for example, specially configured models in the uBR-7200 and uBR-10012 series of CMTSs available from Cisco Systems, Inc. of San Jose, Calif. In an alternative embodiment, the methods of this invention may be implemented on a general-purpose network host machine such as a personal computer or workstation. Further, the invention may be at least partially implemented on a card (e.g., an interface card) for a network device or a general-purpose computing device.

Regardless of network device's configuration, it may employ one or more memories or memory modules (e.g., memory 1007a, 1015a, etc.) configured to store video data, program instructions for the network operations and other functions of the present invention described herein. The program instructions may specify an operating system and one or more applications, for example. Such memory or memories may also be configured to store data structures, video data, or other specific non-program information described herein.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

While the discussion to this point has focused on techniques for cable networks, the technology of the present invention may be applied to any access or shared-access network having a plurality of hosts or nodes which share at least one channel for communicating with at least one head-end in the network. Examples of shared-access networks include, in addition to cable networks, wireless networks, Ethernet, FastEthernet, GigabitEthernet, LANs, etc. In the cable network, the plurality of nodes represents a plurality of cable modems that communicate with at least one CMTS at the centralized termination system using at least one shared-access upstream and downstream channel.

In general, the methods and apparatus described above may be implemented on a traffic handling device (e.g., a switch or router) for providing capability in a network having at least one traffic handling device (e.g., another switch or router) that provides normal service to a host.

Although the foregoing embodiments have been described in some detail for purposes of clarity of understanding, it will be apparent that certain changes and modifications may be practiced within the scope of the appended claims. Therefore, the described embodiments should be taken as illustrative and not restrictive, and the described embodiments should not be limited to the details given herein but should be defined by the following claims and their full scope of equivalents.

What is claimed is:

1. A method comprising:
   receiving a conditioned bitstream that includes a digital insertion location and primary network layer packets that contain compressed video data, the digital insertion location including a number of replaceable network layer packets, wherein the compressed video data in the primary network layer packets of the conditioned bitstream is temporally independent of the digital insertion location;
   receiving a second bitstream that includes replacement compressed video data to be inserted into the digital insertion location in the conditioned bitstream;

determining a location of the digital insertion location in the conditioned bitstream;

adjusting the bitrate of the replacement compressed video data in the second bitstream to be inserted into the digital insertion location to create adjusted replacement compressed video data, wherein the bitrate of the replacement compressed video data is adjusted such that a virtual buffer of a modeled decoder that receives an output bitstream from a channel does not experience overflow or underflow;

providing timestamp information with the replacement compressed video data, wherein the timestamp information is configured to inform a decoder that receives the output bitstream when and where to position replacement video data, derived from the replacement compressed video data after decoding, relative to video data included in the compressed video data in the primary network layer packets;

packetizing the adjusted replacement compressed video data and timestamp information into replacement network layer packets;

combining the replacement network layer packets into the digital insertion location in the conditioned bitstream at the network packet level such that the replacement network layer packets replace the replaceable network layer packets in the conditioned bitstream, without depacketizing the compressed video data in the primary network packets and without decompressing the compressed video data in the primary network packets, to produce the output bitstream including the primary network layer packets of the conditioned bitstream and the replacement compressed video data and timestamp information of the second bitstream; and transmitting the output bitstream onto the channel.

2. The method as recited in claim 1 wherein combining the replacement network layer packets into the digital insertion location in the conditioned bitstream at the network packet level includes splicing the replacement network layer packets into the digital insertion location in the conditioned bitstream at the network packet level.

3. The method as recited in claim 2 wherein a splice-in point of the digital insertion location corresponds to a boundary between a last primary network layer packet before the digital insertion location and a first replaceable network layer packet in the digital insertion location, and a splice-out point of the digital insertion location corresponds to a boundary between a last replaceable network layer packet in the digital insertion location and a first primary network layer packet after the digital insertion location, and wherein the compressed data in the conditioned bitstream before a splice-in point is temporally independent of the compressed data after the splice-in point and the compressed data in the conditioned bitstream before a splice-out point is temporally independent of the compressed data after the splice-out point.

4. The method as recited in claim 1 wherein the conditioned bitstream is packetized into network layer packets according to Internet Protocol.

5. The method as recited in claim 1 wherein determining a location of the digital insertion location comprises obtaining sequence number information that describes the sequence numbers of the network layer packets corresponding to the associated digital insertion location.

6. The method as recited in claim 5 wherein the sequence number information is embedded within the conditioned bitstream or is received out of band.

7. The method as recited in claim 1 wherein adjusting the bitrate of the replacement compressed video data comprises transcoding the replacement compressed video data if the virtual buffer level is below a first desired level, and wherein adjusting the bitrate of the replacement compressed video data comprises inserting stuffing bits into the replacement compressed video data if the virtual buffer level is above a second desired level.

8. The method as recited in claim 1, further comprising including a PCR discontinuity indication with the replacement compressed video data.

9. The method as recited in claim 1, further comprising monitoring the virtual buffer level before, during and after combining and adjusting the bitrate of the replacement compressed video data so as to achieve a desired buffer level.

10. An apparatus comprising:
at least one processor; and
at least one memory, the at least one processor or the at least one memory being configured for:
receiving a conditioned bitstream that includes a digital insertion location and primary network layer packets that contain compressed video data, the digital insertion location including a number of replaceable network layer packets, wherein the compressed video data in the primary network layer packets of the conditioned bitstream is temporally independent of the digital insertion location;
receiving a second bitstream that includes replacement compressed video data to be inserted into the digital insertion location in the conditioned bitstream;
determining a location of the digital insertion location in the conditioned bitstream;
adjusting the bitrate of the replacement compressed video data in the second bitstream to be inserted into the digital insertion location to create adjusted replacement compressed video data, wherein the bitrate of the replacement compressed video data is adjusted such that a virtual buffer of a modeled decoder that receives an output bitstream from a channel does not experience overflow or underflow;
providing timestamp information with the replacement compressed video data, wherein the timestamp information is configured to inform a decoder that receives the output bitstream when and where to position replacement video data, derived from the replacement compressed video data after decoding, relative to video data included in the compressed video data in the primary network layer packets;
packetizing the adjusted replacement compressed video data and timestamp information into replacement network layer packets;
combining the replacement network layer packets into the digital insertion location in the conditioned bitstream at the network packet level such that the replacement network layer packets replace the replaceable network layer packets in the conditioned bitstream, without depacketizing the compressed video data in the primary network packets and without decompressing the compressed video data in the primary network packets, to produce the output bitstream including the primary network layer packets of the conditioned bitstream and the replacement compressed video data and timestamp information of the second bitstream; and
transmitting the output bitstream onto the channel.

11. The apparatus as recited in claim 10, wherein the combining the replacement network layer packets into the digital insertion location in the conditioned bitstream at the network packet level comprises splicing the replacement network layer packets into the digital insertion location in the conditioned bitstream at the network packet level.

12. A non-transitory computer-readable medium storing thereon computer-readable instructions, comprising:
- instructions for obtaining a conditioned bitstream that includes a digital insertion location and primary network layer packets that contain compressed video data, the digital insertion location including a number of replaceable network layer packets, wherein the compressed video data in the primary network layer packets of the conditioned bitstream is temporally independent of the digital insertion location;
- instructions for obtaining a second bitstream that includes replacement compressed video data to be inserted into the digital insertion location in the conditioned bitstream;
- instructions for determining a location of the digital insertion location in the conditioned bitstream;
- instructions for adjusting the bitrate of the replacement compressed video data in the second bitstream to be inserted into the digital insertion location to create adjusted replacement compressed video data, wherein the bitrate of the replacement compressed video data is adjusted such that a virtual buffer of a modeled decoder that receives an output bitstream from a channel does not experience overflow or underflow;
- instructions for providing timestamp information with the replacement compressed video data, wherein the timestamp information is configured to inform a decoder that receives the output bitstream when and where to position replacement video data, derived from the replacement compressed video data after decoding, relative to video data included in the compressed video data in the primary network layer packets;
- instructions for packetizing the adjusted replacement compressed video data and timestamp information into replacement network layer packets;
- instructions for combining the replacement network layer packets into the digital insertion location in the conditioned bitstream at the network packet level such that the replacement network layer packets replace the replaceable network layer packets in the conditioned bitstream, without depacketizing the compressed video data in the primary network packets and without decompressing the compressed video data in the primary network packets, to produce the output bitstream including the primary network layer packets of the conditioned bitstream and the replacement compressed video data and timestamp information of the second bitstream; and
- instructions for transmitting the output bitstream onto the channel.

13. The non-transitory computer-readable medium as recited in claim 12, wherein combining the replacement network layer packets into the digital insertion location in the conditioned bitstream at the network packet level comprises splicing the replacement network layer packets into the digital insertion location in the conditioned bitstream at the network packet level.

14. The non-transitory computer-readable medium as recited in claim 13, wherein a splice-in point of the digital insertion location corresponds to a boundary between a last primary network layer packet before the digital insertion location and a first replaceable network layer packet in the digital insertion location, and a splice-out point of the digital insertion location corresponds to a boundary between a last replaceable network layer packet in the digital insertion location and a first primary network layer packet after the digital insertion location, and wherein the compressed data in the conditioned bitstream before a splice-in point is temporally independent of the compressed data after the splice-in point and the compressed data in the conditioned bitstream before a splice-out point is temporally independent of the compressed data after the splice-out point.

15. The non-transitory computer-readable medium as recited in claim 12, wherein the conditioned bitstream is packetized into network layer packets according to Internet Protocol.

16. The non-transitory computer-readable medium as recited in claim 12, wherein determining a location of the digital insertion location comprises obtaining sequence number information that describes the sequence numbers of the network layer packets corresponding to the associated digital insertion location.

17. The non-transitory computer-readable medium as recited in claim 16, wherein the sequence number information is embedded within the conditioned bitstream or is received out of band.

18. The non-transitory computer-readable medium as recited in claim 12, wherein adjusting the bitrate of the replacement compressed video data comprises transcoding the replacement compressed video data if the virtual buffer level is below a first desired level, and wherein adjusting the bitrate of the replacement compressed video data comprises inserting stuffing bits into the replacement compressed video data if the virtual buffer level is above a second desired level.

19. The non-transitory computer-readable medium as recited in claim 12, further comprising:
- instructions for providing a PCR discontinuity indication with the replacement compressed video data.

20. The non-transitory computer-readable medium as recited in claim 12, further comprising:
- instructions for monitoring the virtual buffer level before, during and after combining and adjusting the bitrate of the replacement compressed video data so as to achieve a desired buffer level.

21. An apparatus, comprising:
- at least one processor; and
- at least one memory, the at least one processor or the at least one memory being configured for:
- obtaining a conditioned bitstream that includes a digital insertion location and primary network layer packets that contain compressed video data, the digital insertion location including a number of replaceable network layer packets, wherein the compressed video data in the primary network layer packets of the conditioned bitstream is temporally independent of the digital insertion location;
- obtaining a second bitstream that includes replacement compressed video data to be inserted into the digital insertion location in the conditioned bitstream;
- determining a location of the digital insertion location in the conditioned bitstream;
- adjusting the bitrate of the replacement compressed video data in the second bitstream to be inserted into the digital insertion location to create adjusted replacement compressed video data, wherein the bitrate of the replacement compressed video data is adjusted such that a virtual buffer of a modeled decoder that receives an output bitstream from a channel does not experience overflow or underflow;
- providing timestamp information with the replacement compressed video data, wherein the timestamp information is configured to inform a decoder that receives the output bitstream when and where to position replacement video data, derived from the replacement compressed video data after decoding, relative to video data included in the compressed video data in the primary network layer packets;

packetizing the adjusted replacement compressed video data and timestamp information into replacement network layer packets;

combining the replacement network layer packets into the digital insertion location in the conditioned bitstream at the network packet level such that the replacement network layer packets replace the replaceable network layer packets in the conditioned bitstream, without depacketizing the compressed video data in the primary network packets and without decompressing the compressed video data in the primary network packets, to produce the output bitstream including the primary network layer packets of the conditioned bitstream and the replacement compressed video data and timestamp information of the second bitstream; and transmitting the output bitstream onto the channel.

22. The apparatus as recited in claim 21, wherein combining the replacement network layer packets into the digital insertion location in the conditioned bitstream at the network packet level comprises splicing the replacement network layer packets into the digital insertion location in the conditioned bitstream at the network packet level.

23. The apparatus as recited in claim 22, wherein a splice-in point of the digital insertion location corresponds to a boundary between a last primary network layer packet before the digital insertion location and a first replaceable network layer packet in the digital insertion location, and a splice-out point of the digital insertion location corresponds to a boundary between a last replaceable network layer packet in the digital insertion location and a first primary network layer packet after the digital insertion location, and wherein the compressed data in the conditioned bitstream before a splice-in point is temporally independent of the compressed data after the splice-in point and the compressed data in the conditioned bitstream before a splice-out point is temporally independent of the compressed data after the splice-out point.

24. The apparatus as recited in claim 21, wherein the conditioned bitstream is packetized into network layer packets according to Internet Protocol.

25. The apparatus as recited in claim 21, wherein determining a location of the digital insertion location comprises obtaining sequence number information that describes the sequence numbers of the network layer packets corresponding to the associated digital insertion location.

26. The apparatus as recited in claim 25, wherein the sequence number information is embedded within the conditioned bitstream or is received out of band.

27. The apparatus as recited in claim 21, wherein adjusting the bitrate of the replacement compressed video data comprises transcoding the replacement compressed video data if the virtual buffer level is below a first desired level, and wherein adjusting the bitrate of the replacement compressed video data comprises inserting stuffing bits into the replacement compressed video data if the virtual buffer level is above a second desired level.

28. The apparatus as recited in claim 21, the at least one processor or the at least one memory being configured for performing steps, further comprising providing a PCR discontinuity indication with the replacement compressed video data.

29. The apparatus as recited in claim 21, the at least one processor or the at least one memory being configured for performing steps, further comprising monitoring the virtual buffer level before, during and after combining and adjusting the bitrate of the replacement compressed video data so as to achieve a desired buffer level.

* * * * *